United States Patent
Simoni et al.

(10) Patent No.: US 12,054,597 B2
(45) Date of Patent: Aug. 6, 2024

(54) COMPOSITIONS COMPRISING 1,2-DICHLORO-1,2-DIFLUOROETHYLENE FOR USE IN FOAM BLOWING APPLICATIONS

(71) Applicant: THE CHEMOURS COMPANY FC, LLC, Wilmington, DE (US)

(72) Inventors: Luke David Simoni, Wilmington, DE (US); Ernest Byron Wysong, Chadds Ford, PA (US); Konstantinos Kontomaris, Wilmington, DE (US); Viacheslav A Petrov, Hockessin, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 503 days.

(21) Appl. No.: 17/278,715

(22) PCT Filed: Oct. 3, 2019

(86) PCT No.: PCT/US2019/054412
§ 371 (c)(1),
(2) Date: Mar. 23, 2021

(87) PCT Pub. No.: WO2020/072725
PCT Pub. Date: Apr. 9, 2020

(65) Prior Publication Data
US 2022/0033607 A1    Feb. 3, 2022

Related U.S. Application Data

(60) Provisional application No. 62/742,133, filed on Oct. 5, 2018.

(51) Int. Cl.
| | |
|---|---|
| *C08J 9/14* | (2006.01) |
| *C09D 5/02* | (2006.01) |
| *C09D 125/06* | (2006.01) |
| *C09D 175/04* | (2006.01) |

(52) U.S. Cl.
CPC .............. *C08J 9/147* (2013.01); *C08J 9/146* (2013.01); *C09D 5/021* (2013.01); *C09D 125/06* (2013.01); *C09D 175/04* (2013.01); *C08J 2201/03* (2013.01); *C08J 2203/162* (2013.01); *C08J 2203/182* (2013.01); *C08J 2325/06* (2013.01); *C08J 2375/04* (2013.01)

(58) Field of Classification Search
CPC ... C08J 9/141; C08J 9/146; C08J 9/147; C08J 9/149; C08J 9/34; C08J 2201/03; C08J 2203/14; C08J 2203/142; C08J 2203/162; C08J 2203/182; C08J 2205/04; C08J 2205/044; C08J 2205/052; C08J 2207/04; C08J 2300/22; C08J 2323/04; C08J 2323/10; C08J 2325/10; C08J 2325/12; C08J 2355/02; C08J 2375/04; C08K 5/01; C08K 5/02; C08K 5/021; C09D 5/021; C09D 125/06; C09D 175/04; C08L 23/04; C08L 23/10; C08L 25/06; C08L 25/12; C08L 55/02
See application file for complete search history.

(56) References Cited

U.S. PATENT DOCUMENTS

| | | |
|---|---|---|
| 5,164,419 A | 11/1992 | Bartlett et al. |
| 5,204,169 A | 4/1993 | York |
| 2017/0081491 A1* | 3/2017 | Chen ................. C08G 18/42 |

FOREIGN PATENT DOCUMENTS

| | | |
|---|---|---|
| CN | 103627020 A | 3/2014 |
| EP | 3 275 927 A1 | 1/2018 |
| GB | 1098127 A | 1/1968 |
| WO | 2009/132242 A2 | 10/2009 |
| WO | 2018/165623 A1 | 9/2018 |

OTHER PUBLICATIONS

PCT International Search Report and Written Opinion for International PCT Application No. PCT/US2019/054412 mailed Feb. 4, 2020.
Scientific Assessment of Ozone Depletion: 2002, World Meteorological Organization Global Ozone Research and Monitoring Project—Report No. 47, 2002, pp. 1.28-1.31.
Standard Test Method for Melt Flow Rates of Thermoplastics by Extrusion Plastometer, ASTM Designation: D1238-13, West Conshohocken, PA.
Standard Test Method for Concentration Limits of Flammability of Chemicals (Vapors and Gases), ASTM Designation: E681-09 (Reapproved 2015), West Conshohocken, PA.
Standard Test Method for Steady-State Thermal Transmission Properties by Means of the Heat Flow Meter Apparatus, ASTM Designation:C518-10, West Conshohocken, PA.
Saunders & Frisch, Polyurethanes Chemistry and Technology, 1962, pp. 193-201 and 219-223, vols. I and II, John Wiley and Sons, New York, NY.
Richard E. Skochdopole & Gary C. Welsh, Encyclopedia of Polymer Science and Engineering, 1989, pp. 193-205, vol. 16, John Wiley & Sons.

* cited by examiner

*Primary Examiner* — John M Cooney

(57) ABSTRACT

This invention relates to compositions comprising 1,2-dichloro-1,2-difluoroethylene (i.e., CFO-1112) and an additional component. The compositions described herein may be useful, for example, in foam blowing applications.

11 Claims, 1 Drawing Sheet

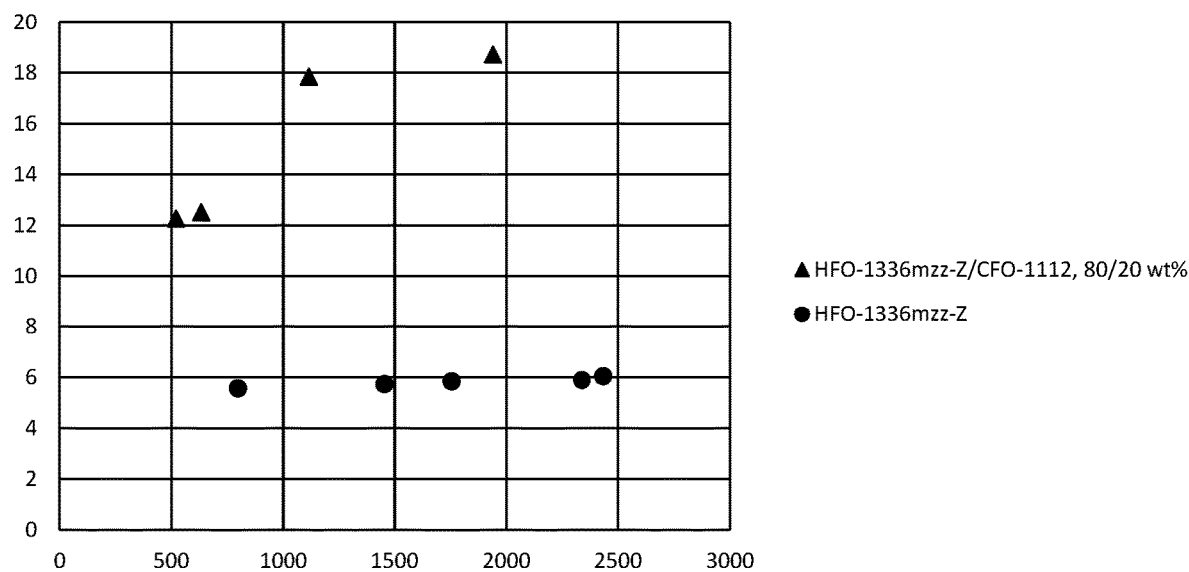

COMPOSITIONS COMPRISING 1,2-DICHLORO-1,2-DIFLUOROETHYLENE FOR USE IN FOAM BLOWING APPLICATIONS

CROSS-REFERENCE TO RELATED APPLICATIONS

This application represents a national filing under 35 U.S.C. 371 of International Application No. PCT/US2019/054412 filed Oct. 3, 2019 which claims the benefit of U.S. Provisional Application Ser. No. 62/742,133, filed Oct. 5, 2018, the disclosure of which is incorporated herein by reference in its entirety.

TECHNICAL FIELD

The present application provides compositions comprising 1,2-dichloro-1,2-difluoroethylene (i.e., CFO-1112) and one or more additional components. The compositions described herein may be useful, for example, in foam blowing applications.

BACKGROUND

The production of various types of foams historically employed chlorofluorocarbons (i.e., CFCs) as the blowing agent. In general, the CFCs yield foams exhibiting good thermal insulation, low flammability, and excellent dimensional stability. However, despite these advantages the CFCs have fallen into disfavor due to their implication in the destruction of stratospheric ozone, as well as their implication in contributing to global warming. Thus, there is a need for blowing agents to have both low ODP (ozone depletion potential) and GWP (global warming potential).

SUMMARY

The present application provides, inter alia, processes for preparing polymer foams (e.g., thermoplastic or thermoset polymer foams) comprising reacting or extruding a foamable composition comprising a polymer and a blowing agent under conditions effective to form a foam, wherein the blowing agent comprises 1,2-dichloro-1,2-difluoroethylene (i.e., CFO-1112) and one or more additional components as described herein.

The present application further provides foams comprising a blowing agent composition described herein.

The present application further provides foams prepared according to one or more of the processes described herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

BRIEF DESCRIPTION OF THE DRAWINGS

FIG. 1 shows the solubility of an HFO-1336mzz(Z)/CFO-1112 blend containing 20 wt % CFO-1112 in polystyrene homo-polymer CX-5197 (Melt Flow Index of 4.5-5.0 produced by Total) at 179° C. compared to the solubility of neat HFO-136mzz(Z) in the polystyrene homo-polymer, as solubility (phr, y-axis) vs pressure (psia, x-axis).

DETAILED DESCRIPTION

Closed-cell polyisocyanate-based foams are widely used for insulation purposes, for example, in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are widely used for a variety of applications including insulating roofs, insulating large structures such as storage tanks, insulating appliances such as refrigerators and freezers, insulating refrigerated trucks and railcars, etc.

All of these various types of polyurethane foams require blowing (expansion) agents for their manufacture. Insulating foams depend on the use of halocarbon blowing agents, not only to foam the polymer, but also for their low vapor thermal conductivity, a very important characteristic for insulation value. Historically, polyurethane foams used CFCs (chlorofluorocarbons, for example CFC-11, trichlorofluoromethane), HCFCs (hydrochlorofluorocarbons, for example HCFC-141b, 1,1-dichloro-1-fluoroethane), and HFCs (hydrofluorocarbons, for example, HFC-245fa, HFC-365mfc) as the primary blowing agents.

In general, CFCs produce foams exhibiting good thermal insulation, low flammability, and excellent dimensional stability. However, despite these advantages, CFCs have fallen into disfavor due to the implication of chlorine-containing molecules in the destruction of stratospheric ozone. Further, the production and use of CFCs has been restricted by the Montreal Protocol. HCFCs have been proposed as CFC substitutes, and are currently employed as foam blowing agents. However, HCFCs have also been shown to contribute to the depletion of stratospheric ozone, and as a result their use has come under scrutiny. The widespread use of HCFCs is scheduled for eventual phase out under the Montreal Protocol.

Incumbent agents with high global warming potentials (GWPs) for the expansion of thermoplastic foam, e.g. extruded polystyrene foam (XPS), are under regulatory pressure. 1,1,1,4,4,4-hexafluoro-2-butene (i.e., HFO-1336mzz) could, in principle, be used as a low-GWP agent for the expansion of polystyrene (or other thermoplastic polymer) into foam with high thermal insulation capability. However, HFO-1336mzz has low solubility in softened polystyrene under the operating conditions of the incumbent extrusion process. As a result, they would lead to suboptimal foam properties (e.g., higher than desirable foam density). A blowing agent for the expansion of thermoplastic foam (e.g., polystyrene foam) should be sufficiently soluble in the molten thermoplastic polymer (e.g., polystyrene resin) under foam formation conditions so that an adequate volume of the blowing agent is available during the foam expansion and cooling phase to form cells and reduce the effective foam density to the target value. Expansion agent present in excess of its solubility could lead to foam defects.

The compositions provided herein may be useful as blowing agents with low or moderate GWP for the expansion of thermoset and/or thermoplastic foams.

Definitions & Abbreviations

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the term "about" is meant to account for variations due to experimental error (e.g., plus or minus approximately 10% of the indicated value). All measurements reported herein are understood to be modified by the term "about", whether or not the term is explicitly used, unless explicitly stated otherwise.

As used herein, the term "consisting of" excludes any element, step, or ingredient not specified. If in the claim, such would close the claim to the inclusion of materials other than those recited except for impurities ordinarily associated therewith. When the phrase "consists of" or "consisting of" appears in a clause of the body of a claim, rather than immediately following the preamble, it limits only the element set forth in that clause; other elements are not excluded from the claim as a whole.

As used herein, the term "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term "consists essentially of" or "consisting essentially of" occupies a middle ground between "comprising" and "consisting of".

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced.

As used herein the term "Ozone depletion potential" (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

The following abbreviations may be used herein:
CFC: chlorofluorocarbon
GWP: global warming potential
HCFC: hydrochlorofluorocarbon
HCFO: hydrochlorofluoroolefin
HCFO-1224yd-Z: (Z)-1-chloro-2,3,3,3-tetrafluoroprop-1-ene HFC: hydrofluorocarbon
HFC-32: difluoromethane
HFC-134: 1,1,2,2-tetrafluoroethane
HFC-134a: 1,1,1,2-tetrafluoroethane
HFC-152a: 1,1-difluoroethane
HFC-227ca: 1,1,1,2,2,3,3-heptafluoropropane
HFC-227ea: 1,1,1,2,3,3,3-heptafluoropropane
HFC-236ea: 1,1,1,2,3,3-hexafluoropropane
HFC-245ca: 1,1,2,2,3-pentafluoropropane
HFC-245eb: 1,1,1,2,3-pentafluoropropane
HFC-245cb: 1,1,1,2,2-pentafluoropropane
HFC-245ea: 1,1,2,3,3-pentafluoropropane
HFC-245fa: 1,1,1,3,3-pentafluoropropane
HFC-365mfc: 1,1,1,3,3-pentafluorobutane
HFC-43-10mee: 1,1,1,2,2,3,4,5,5,5-decafluoropentane
HFO: hydrofluoroolefin
HFO-1234ye-E: (E)-1,2,3,3-tetrafluoropropene
HFO-1234ye-Z: (Z)-1,2,3,3-tetrafluoropropene
HFO-1234yf: 2,3,3,3-tetrafluoropropene
HFO-1234ze-E: (E)-1,3,3,3-tetrafluoropropene
HFO-1234ze-Z: (Z)-1,3,3,3-tetrafluoropropene
HFO-1243zf: 3,3,3-trifluoropropene
HFO-1336mzz-Z or 1336mzz-Z: (Z)-1,1,1,4,4,4-hexafluoro-2-butene
HFO-1336mzz-E or 1336mzz-E: (E)-1,1,1,4,4,4-hexafluoro-2-butene
HFO-1336yf: 2,3,3,4,4,4-hexafluoro-1-butene
HFO-1336ze-E: (E)-1,3,3,4,4,4-hexafluoro-1-butene
HFO-1336ze-Z: (Z)-1,3,3,4,4,4-hexafluoro-1-butene
HFO-1345mzz-E: (E)-1,1,1,4,4-pentafluorobut-2-ene
HFO-1429mzy: 1,1,1,3,4,4,5,5,5-nonafluoro-2-pentene
HFO-1438ezy-E: (E)-1,3,4,4,4-pentafluoro-3-(trifluoromethyl)but-1-ene
HFO-1438ezy-Z: (Z)-1,3,4,4,4-pentafluoro-3-(trifluoromethyl)but-1-ene
HFO-1438mzz-E: (E)-1,1,1,4,4,5,5,5-octafluoro-2-pentene
HFO-1438mzz-Z: (Z)-1,1,1,4,4,5,5,5-octafluoro-2-pentene
HFO-153-10mzzy: 1,1,1,4,5,5,5-heptafluoro-4-trifluoromethyl-2-pentene
HCFO-1224yd-E: (E)-1-chloro-2,3,3,3-tetrafluoropropene
HCFO-1224yd-Z: (Z)-1-chloro-2,3,3,3-tetrafluoropropene
HCFO-1233xf:
HCFO-1233zd-E: (E)-1-chloro-3,3,3-trifluoropropene
HCFO-1233zd-Z: (Z)-1-chloro-3,3,3-trifluoropropene
MFI: Melt Flow Index
ODP: Ozone depletion potential
PS: polystyrene
wt %: weight percent or percent by weight

Compositions of the Invention

The present application provides a composition (e.g., a blowing agent composition) comprising:
i) 1,2-dichloro-1,2-difluoroethylene (CFO-1112); and
ii) one or more compounds selected from 2-chloropropane, trans-1,2-dichloroethylene, n-propane, cyclopropane, n-butane, cyclobutane, iso-butane, n-pentane, cyclopentane, iso-pentane, neo-pentane, carbon dioxide, nitrogen, argon, water, methanol, ethanol, n-propanol, iso-propanol, dimethyl ether, ethyl methyl ether, diethyl ether, dimethoxymethane, methyl acetate, ethyl acetate, methyl formate, ethyl formate, ethylene oxide, propylene oxide, fluorinated epoxides, HFC-32, HFC-134a, HFC-134, HFC-152a, HFC-227ca, HFC-227ea, HFC-236ea, HFC-245ca, HFC-245eb, HFC-245cb, HFC-245ea, HFC-245fa, HFC-365mfc, HFC-43-10mee HFO-1234ye-E, HFO-1234ye-Z, HFO-1234yf, HFO-1234ze-E, HFO-1234ze-Z, HFO-1243zf, HFO-1336mzz-E, HFO-1336mzz-Z, HFO-1336yf, HFO-1336ze-E, HFO-1336ze-Z, HFO-1345mzz-E, HFO-1429mzy, HFO-1438ezy-E, HFO-1438ezy-Z, HFO-1438mzz-E, HFO-1438mzz-Z, HFO-153-10mzzy, HCFO-1224yd-E, HCFO-1224yd-Z, HCFO-1233xf, HCFO-1233zd-E, and HCFO-1233zd-Z.

In some embodiments, the 1,2-dichloro-1,2-difluoroethylene is (E)-1,2-dichloro-1,2-difluoroethylene. In some embodiments, the 1,2-dichloro-1,2-difluoroethylene is (Z)-1,2-dichloro-1,2-difluoroethylene.

In some embodiments, the 1,2-dichloro-1,2-difluoroethylene comprises a mixture of (E)-1,2-dichloro-1,2-difluoroethylene and (Z)-1,2-dichloro-1,2-difluoroethylene.

In some embodiments, the 1,2-dichloro-1,2-difluoroethylene comprises about 60% to about 70% E-1,2-dichloro-1,2-difluoroethylene and about 30% to about 40% Z-1,2-dichloro-1,2-difluoroethylene.

In some embodiments, the 1,2-dichloro-1,2-difluoroethylene comprises about 60% E-1,2-dichloro-1,2-difluoroethylene and about 40% Z-1,2-dichloro-1,2-difluoroethylene. In some embodiments, the 1,2-dichloro-1,2-difluoroethylene comprises about 70% E-1,2-dichloro-1,2-difluoroethylene and about 30% Z-1,2-dichloro-1,2-difluoroethylene.

In some embodiments, the composition provided herein comprises about 1 to about 99 weight percent 1,2-dichloro-1,2-difluoroethylene, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent 1,2-dichloro-1,2-difluoroethylene.

In some embodiments, the composition comprises about 1 to about 99 weight percent 2-chloropropane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent 2-chloropropane. In some embodiments, the composition comprises about 1 to about 99 weight percent 1,2-dichloro-1,2-difluoroethylene and about 1 to about 99 weight percent 2-chloropropane. In some embodiments, the composition consists essentially of 1,2-dichloro-1,2-difluoroethylene and 2-chloropropane. In some embodiments, the composition consists of 1,2-dichloro-1,2-difluoroethylene and 2-chloropropane.

In some embodiments, the composition comprises about 1 to about 99 weight percent trans-1,2-dichloroethylene, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent trans-1,2-dichloroethylene. In some embodiments, the composition comprises about 1 to about 99 weight percent 1,2-dichloro-1,2-difluoroethylene and about 1 to about 99 weight percent trans-1,2-dichloroethylene. In some embodiments, the composition consists essentially of 1,2-dichloro-1,2-difluoroethylene and trans-1,2-dichloroethylene. In some embodiments, the composition consists of 1,2-dichloro-1,2-difluoroethylene and trans-1,2-dichloroethylene.

In some embodiments, the composition comprises about 1 to about 99 weight percent n-propane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent n-propane. In some embodiments, the composition comprises about 1 to about 99 weight percent 1,2-dichloro-1,2-difluoroethylene and about 1 to about 99 weight percent n-propane. In some embodiments, the composition consists essentially of 1,2-dichloro-1,2-difluoroethylene and n-propane. In some embodiments, the composition consists of 1,2-dichloro-1,2-difluoroethylene and n-propane.

In some embodiments, the composition comprises about 1 to about 99 weight percent cyclopropane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent cyclopropane. In some embodiments, the composition comprises about 1 to about 99 weight percent 1,2-dichloro-1,2-difluoroethylene and about 1 to about 99 weight percent cyclopropane. In some embodiments, the composition consists essentially of 1,2-dichloro-1,2-difluoroethylene and cyclopropane. In some embodiments, the composition consists of 1,2-dichloro-1,2-difluoroethylene and cyclopropane.

In some embodiments, the composition comprises about 1 to about 99 weight percent n-butane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent n-butane. In some embodiments, the composition comprises about 1 to about 99 weight percent 1,2-dichloro-1,2-difluoroethylene and about 1 to about 99 weight percent n-butane. In some embodiments, the composition consists essentially of 1,2-dichloro-1,2-difluoroethylene and n-butane. In some embodiments, the composition consists of 1,2-dichloro-1,2-difluoroethylene and n-butane.

In some embodiments, the composition comprises about 1 to about 99 weight percent cyclobutane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent cyclobutane. In some embodiments, the composition comprises about 1 to about 99 weight percent 1,2-dichloro-1,2-difluoroethylene and about 1 to about 99 weight percent cyclobutane. In some embodiments, the composition consists essentially of 1,2-dichloro-1,2-difluoroethylene and cyclobutane. In some embodiments, the composition consists of 1,2-dichloro-1,2-difluoroethylene and cyclobutane.

In some embodiments, the composition comprises about 1 to about 99 weight percent iso-butane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent iso-butane. In some embodiments, the composition comprises about 1 to about 99 weight percent 1,2-dichloro-1,2-difluoroethylene and about 1 to about 99 weight percent iso-butane. In some embodiments, the composition consists essentially of 1,2-dichloro-1,2-difluoroethylene and iso-butane. In some embodiments, the composition consists of 1,2-dichloro-1,2-difluoroethylene and iso-butane.

In some embodiments, the composition comprises about 1 to about 99 weight percent n-pentane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent n-pentane. In some embodiments, the composition comprises about 1 to about 99 weight percent 1,2-dichloro-1,2-difluoroethylene and about 1 to about 99 weight percent n-pentane. In some embodiments, the composition consists essentially of 1,2-dichloro-1,2-difluoroethylene and n-pentane. In some embodiments, the composition consists of 1,2-dichloro-1,2-difluoroethylene and n-pentane.

In some embodiments, the composition comprises about 1 to about 99 weight percent cyclopentane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent cyclopentane. In some embodiments, the composition comprises about 1 to about 99 weight percent 1,2-dichloro-1,2-difluoroethylene and about 1 to about 99 weight percent cyclopentane. In some embodiments, the composition consists essentially of 1,2-dichloro-1,2-difluoroethylene and cyclopentane. In some embodiments, the composition consists of 1,2-dichloro-1,2-difluoroethylene and cyclopentane.

In some embodiments, the composition comprises about 1 to about 99 weight percent iso-pentane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent iso-pentane. In some embodiments, the composition comprises about 1 to about 99 weight percent 1,2-dichloro-1,2-difluoroethylene and about 1 to about 99 weight percent iso-pentane. In some embodiments, the composition consists essentially of 1,2-dichloro-1,2-difluoroethylene and iso-pentane. In some embodiments, the composition consists of 1,2-dichloro-1,2-difluoroethylene and iso-pentane.

In some embodiments, the composition comprises about 1 to about 99 weight percent neo-pentane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent neo-pentane. In some embodiments, the composition comprises about 1 to about 99 weight percent 1,2-dichloro-1,2-difluoroethylene and about 1 to about 99 weight percent neo-pentane. In some embodiments, the composition consists essentially of 1,2-dichloro-1,2-difluoroethylene and neo-pentane. In some embodiments, the composition consists of 1,2-dichloro-1,2-difluoroethylene and neo-pentane.

In some embodiments, the composition comprises about 1 to about 99 weight percent carbon dioxide, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent carbon dioxide. In some embodiments, the composition comprises about 1 to about 99 weight percent 1,2-dichloro-1,2-difluoroethylene and about 1 to about 99 weight percent carbon dioxide. In some embodiments, the composition consists essentially of 1,2-dichloro-1,2-difluoroethylene and carbon dioxide. In some embodiments, the composition consists of 1,2-dichloro-1,2-difluoroethylene and carbon dioxide.

In some embodiments, the composition comprises about 1 to about 99 weight percent nitrogen, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent nitrogen. In some embodiments, the composition comprises about 1 to about 99 weight percent 1,2-dichloro-1,2-difluoroethylene and about 1 to about 99 weight percent nitrogen. In some embodiments, the composition consists essentially of 1,2-dichloro-1,2-difluoroethylene and nitrogen. In some embodiments, the composition consists of 1,2-dichloro-1,2-difluoroethylene and nitrogen.

In some embodiments, the composition comprises about 1 to about 99 weight percent argon, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent argon. In some embodiments, the composition comprises about 1 to about 99 weight percent 1,2-dichloro-1,2-difluoroethylene and about 1 to about 99 weight percent argon. In some embodiments, the composition consists essentially of 1,2-dichloro-1,2-difluoroethylene and argon. In some embodiments, the composition consists of 1,2-dichloro-1,2-difluoroethylene and argon.

In some embodiments, the composition comprises about 1 to about 99 weight percent water, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent water. In some embodiments, the composition comprises about 1 to about 99 weight percent 1,2-dichloro-1,2-difluoroethylene and about 1 to about 99 weight percent water. In some embodiments, the composition consists essentially of 1,2-dichloro-1,2-difluoroethylene and water. In some embodiments, the composition consists of 1,2-dichloro-1,2-difluoroethylene and water.

In some embodiments, the composition comprises about 1 to about 99 weight percent methanol, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent methanol. In some embodiments, the composition comprises about 1 to about 99 weight percent 1,2-dichloro-1,2-difluoroethylene and about 1 to about 99 weight percent methanol. In some embodiments, the composition consists essentially of 1,2-dichloro-1,2-difluoroethylene and methanol. In some embodiments, the composition consists of 1,2-dichloro-1,2-difluoroethylene and methanol.

In some embodiments, the composition comprises about 1 to about 99 weight percent ethanol, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent ethanol. In some embodiments, the composition comprises about 1 to about 99 weight percent 1,2-dichloro-1,2-difluoroethylene and about 1 to about 99 weight percent ethanol. In some embodiments, the composition consists essentially of 1,2-dichloro-1,2-difluoroethylene and ethanol. In some embodiments, the composition consists of 1,2-dichloro-1,2-difluoroethylene and ethanol.

In some embodiments, the composition comprises about 1 to about 99 weight percent n-propanol, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent n-propanol. In some embodiments, the composition comprises about 1 to about 99 weight percent 1,2-dichloro-1,2-difluoroethylene and about 1 to about 99 weight percent n-propanol. In some embodiments, the composition consists essentially of 1,2-dichloro-1,2-difluoroethylene and n-propanol. In some embodiments, the composition consists of 1,2-dichloro-1,2-difluoroethylene and n-propanol.

In some embodiments, the composition comprises about 1 to about 99 weight percent iso-propanol, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent iso-propanol. In some embodiments, the composition comprises about 1 to about 99 weight percent 1,2-dichloro-1,2-difluoroethylene and about 1 to about 99 weight percent iso-propanol. In some embodiments, the composition consists essentially of 1,2-dichloro-1,2-difluoroethylene and iso-propanol. In some embodiments, the composition consists of 1,2-dichloro-1,2-difluoroethylene and iso-propanol.

In some embodiments, the composition comprises about 1 to about 99 weight percent dimethyl ether, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent dimethyl ether. In some embodiments, the composition comprises about 1 to about 99 weight percent 1,2-dichloro-1,2-difluoroethylene and about 1 to about 99 weight percent dimethyl ether. In some embodiments, the composition consists essentially of 1,2-dichloro-1,2-difluoroethylene and dimethyl ether. In some embodiments, the composition consists of 1,2-dichloro-1,2-difluoroethylene and dimethyl ether.

In some embodiments, the composition comprises about 1 to about 99 weight percent ethyl methyl ether, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent ethyl methyl ether. In some embodiments, the composition comprises about 1 to about 99 weight percent 1,2-dichloro-1,2-difluoroethylene and about 1 to about 99 weight percent ethyl methyl ether. In some embodiments, the composition consists essentially of 1,2-dichloro-1,2-difluoroethylene and ethyl methyl ether. In some embodiments, the composition consists of 1,2-dichloro-1,2-difluoroethylene and ethyl methyl ether.

In some embodiments, the composition comprises about 1 to about 99 weight percent diethyl ether, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent diethyl ether. In some embodiments, the composition comprises about 1 to about 99 weight percent 1,2-dichloro-1,2-difluoroethylene and about 1 to about 99 weight percent diethyl ether. In some embodiments, the composition consists essentially of 1,2-dichloro-1,2-difluoroethylene and diethyl ether. In some embodiments, the composition consists of 1,2-dichloro-1,2-difluoroethylene and diethyl ether.

In some embodiments, the composition comprises about 1 to about 99 weight percent dimethoxymethane, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent dimethoxymethane. In some embodiments, the composition comprises about 1 to about 99 weight percent 1,2-dichloro-1,2-difluoroethylene and about 1 to about 99 weight percent dimethoxymethane. In some embodiments, the composition consists essentially of 1,2-dichloro-1,2-difluoroethylene and dimethoxymethane. In some embodiments, the composition consists of 1,2-dichloro-1,2-difluoroethylene and dimethoxymethane.

In some embodiments, the composition comprises about 1 to about 99 weight percent methyl acetate, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent methyl acetate. In some embodiments, the composition comprises about 1 to about 99 weight percent 1,2-dichloro-1,2-difluoroethylene and about 1 to about 99 weight percent methyl acetate. In some embodiments, the composition consists essentially of 1,2-dichloro-1,2-difluoroethylene and methyl acetate. In some embodiments, the composition consists of 1,2-dichloro-1,2-difluoroethylene and methyl acetate.

In some embodiments, the composition comprises about 1 to about 99 weight percent ethyl acetate, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent ethyl acetate. In some embodiments, the composition comprises about 1 to about 99 weight percent 1,2-dichloro-1,2-difluoroethylene and about 1 to about 99 weight percent ethyl acetate. In some embodiments, the composition consists essentially of 1,2-dichloro-1,2-difluoroethylene and ethyl acetate. In some embodiments, the composition consists of 1,2-dichloro-1,2-difluoroethylene and ethyl acetate.

In some embodiments, the composition comprises about 1 to about 99 weight percent methyl formate, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent methyl formate. In some embodiments, the composition comprises about 1 to about 99 weight percent 1,2-dichloro-1,2-difluoroethylene and about 1 to about 99 weight percent methyl formate. In some embodiments, the composition consists essentially of 1,2-dichloro-1,2-difluoroethylene and methyl formate. In some embodiments, the composition consists of 1,2-dichloro-1,2-difluoroethylene and methyl formate.

In some embodiments, the composition comprises about 1 to about 99 weight percent ethyl formate, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent ethyl formate. In some embodiments, the composition comprises about 1 to about 99 weight percent 1,2-dichloro-1,2-difluoroethylene and about 1 to about 99 weight percent ethyl formate. In some embodiments, the composition consists essentially of 1,2-dichloro-1,2-difluoroethylene and ethyl formate. In some embodiments, the composition consists of 1,2-dichloro-1,2-difluoroethylene and ethyl formate.

In some embodiments, the composition comprises about 1 to about 99 weight percent ethylene oxide, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent ethylene oxide. In some embodiments, the composition comprises about 1 to about 99 weight percent 1,2-dichloro-1,2-difluoroethylene and about 1 to about 99 weight percent ethylene oxide. In some embodiments, the composition consists essentially of 1,2-dichloro-1,2-difluoroethylene and ethylene oxide. In some embodiments, the composition consists of 1,2-dichloro-1,2-difluoroethylene and ethylene oxide.

In some embodiments, the composition comprises about 1 to about 99 weight percent propylene oxide, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent propylene oxide. In some embodiments, the composition comprises about 1 to about 99 weight percent 1,2-dichloro-1,2-difluoroethylene and about 1 to about 99 weight percent propylene oxide. In some embodiments, the composition consists essentially of 1,2-dichloro-1,2-difluoroethylene and propylene oxide. In some embodiments, the composition consists of 1,2-dichloro-1,2-difluoroethylene and propylene oxide.

In some embodiments, the composition comprises about 1 to about 99 weight percent of a fluorinated epoxide, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent of a fluorinated epoxide. In some embodiments, the composition comprises about 1 to about 99 weight percent 1,2-dichloro-1,2-difluoroethylene and about 1 to about 99 weight percent of a fluorinated epoxide. In some embodiments, the composition consists essentially of 1,2-dichloro-1,2-difluoroethylene and a fluorinated epoxide. In some embodiments, the composition consists of 1,2-dichloro-1,2-difluoroethylene and a fluorinated epoxide.

In some embodiments, the composition comprises about 1 to about 99 weight percent HFC-32, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-32. In some embodiments, the composition comprises about 1 to about 99 weight percent 1,2-dichloro-1,2-difluoroethylene and about 1 to about 99 weight percent HFC-32. In some embodiments, the composition consists essentially of 1,2-dichloro-1,2-difluoroethylene and HFC-32. In some embodiments, the composition consists of 1,2-dichloro-1,2-difluoroethylene and HFC-32.

In some embodiments, the composition comprises about 1 to about 99 weight percent HFC-134a, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-134a. In some embodiments, the composition comprises about 1 to about 99 weight percent 1,2-dichloro-1,2-difluoroethylene and about 1 to about 99 weight percent HFC-134a. In some embodiments, the composition consists essentially of 1,2-dichloro-1,2-difluoroethylene and HFC-134a. In some embodiments, the composition consists of 1,2-dichloro-1,2-difluoroethylene and HFC-134a.

In some embodiments, the composition comprises about 1 to about 99 weight percent HFC-134, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-134. In some embodiments, the composition comprises about 1 to about 99 weight percent 1,2-dichloro-1,2-difluoroethylene and about 1 to about 99 weight percent HFC-134. In some embodiments, the composition consists essentially of 1,2-dichloro-1,2-difluoroethylene and HFC-134. In some embodiments, the composition consists of 1,2-dichloro-1,2-difluoroethylene and HFC-134.

In some embodiments, the composition comprises about 1 to about 99 weight percent HFC-152a, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-152a. In some embodiments, the composition comprises about 1 to about 99 weight percent 1,2-dichloro-1,2-difluoroethylene and about 1 to about 99 weight percent HFC-152a. In some embodiments, the composition comprises about 85 to about 99 weight percent 1,2-dichloro-1,2-difluoroethylene and about 15 to about 1 weight percent HFC-152a. In some embodiments, the composition comprises about 85 to about 95 weight percent 1,2-dichloro-1,2-difluoroethylene and about 15 to about 5 weight percent HFC-152a. In some embodiments, the composition comprises about 88 to about 92 weight percent 1,2-dichloro-1,2-difluoroethylene and about 12 to about 8 weight percent HFC-152a. In some embodiments, the composition comprises about 90 weight percent 1,2-dichloro-1,2-difluoroethylene and about 10 weight percent HFC-152a. In some embodiments, the composition consists essentially of 1,2-dichloro-1,2-difluoroethylene and HFC-152a. In some embodiments, the composition consists of 1,2-dichloro-1,2-difluoroethylene and HFC-152a.

In some embodiments, the composition comprises about 1 to about 99 weight percent HFC-227ca, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-227ca. In some embodiments, the composition comprises about 1 to about 99 weight percent 1,2-dichloro-1,2-difluoroethylene and about 1 to about 99 weight percent HFC-227ca. In some embodiments, the composition consists essentially of 1,2-dichloro-1,2-difluoroethylene and HFC-227ca. In some embodiments, the composition consists of 1,2-dichloro-1,2-difluoroethylene and HFC-227ca.

In some embodiments, the composition comprises about 1 to about 99 weight percent HFC-227ea, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-227ea. In some embodiments, the composition comprises about 1 to about 99 weight percent 1,2-dichloro-1,2-difluoroethylene and about 1 to about 99 weight percent HFC-227ea. In some embodiments, the composition consists essentially of 1,2-dichloro-1,2- difluoroethylene and HFC-227ea. In some embodiments, the composition consists of 1,2-dichloro-1,2-difluoroethylene and HFC-227ea.

In some embodiments, the composition comprises about 1 to about 99 weight percent HFC-236ea, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-236ea. In some embodiments, the composition comprises about 1 to about 99 weight percent 1,2-dichloro-1,2-difluoroethylene and about 1 to about 99 weight percent HFC-236ea. In some embodiments, the composition consists essentially of 1,2-dichloro-1,2-difluoroethylene and HFC-236ea. In some embodiments, the composition consists of 1,2-dichloro-1,2-difluoroethylene and HFC-236ea.

In some embodiments, the composition comprises about 1 to about 99 weight percent HFC-245ca, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-245ca. In some embodiments, the composition comprises about 1 to about 99 weight percent 1,2-dichloro-1,2-difluoroethylene and about 1 to about 99 weight percent HFC-245ca. In some embodiments, the composition consists essentially of 1,2-dichloro-1,2-difluoroethylene and HFC-245ca. In some embodiments, the composition consists of 1,2-dichloro-1,2-difluoroethylene and HFC-245ca.

In some embodiments, the composition comprises about 1 to about 99 weight percent HFC-245eb, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-245eb. In some embodiments, the composition comprises about 1 to about 99 weight percent 1,2-dichloro-1,2-difluoroethylene and about 1 to about 99 weight percent HFC-245eb. In some embodiments, the composition consists essentially of 1,2-dichloro-1,2-difluoroethylene and HFC-245eb. In some embodiments, the composition consists of 1,2-dichloro-1,2-difluoroethylene and HFC-245eb.

In some embodiments, the composition comprises about 1 to about 99 weight percent HFC-245cb, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-245cb. In some embodiments, the composition comprises about 1 to about 99 weight percent 1,2-dichloro-1,2-difluoroethylene and about 1 to about 99 weight percent HFC-245cb. In some embodiments, the composition consists essentially of 1,2-dichloro-1,2-difluoroethylene and HFC-245cb. In some embodiments, the composition consists of 1,2-dichloro-1,2-difluoroethylene and HFC-245cb.

In some embodiments, the composition comprises about 1 to about 99 weight percent HFC-245ea, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-245ea. In some embodiments, the composition comprises about 1 to about 99 weight percent 1,2-dichloro-1,2-difluoroethylene and about 1 to about 99 weight percent HFC-245ea. In some embodiments, the composition consists essentially of 1,2-dichloro-1,2-difluoroethylene and HFC-245ea. In some embodiments, the composition consists of 1,2-dichloro-1,2-difluoroethylene and HFC-245ea.

In some embodiments, the composition comprises about 1 to about 99 weight percent HFC-245fa, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-245fa. In some embodiments, the composition comprises about 1 to about 99 weight percent 1,2-dichloro-1,2-difluoroethylene and about 1 to about 99 weight percent HFC-245fa. In some embodiments, the composition consists essentially of 1,2-dichloro-1,2-difluoroethylene and HFC-245fa. In some embodiments, the composition consists of 1,2-dichloro-1,2-difluoroethylene and HFC-245fa.

In some embodiments, the composition comprises about 1 to about 99 weight percent HFC-365mfc, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-365mfc. In some embodiments, the composition comprises about 1 to about 99 weight percent 1,2-dichloro-1,2-difluoroethylene and about 1 to about 99 weight percent HFC-365mfc. In some embodiments, the composition consists essentially of 1,2-dichloro-1,2-difluoroethylene and HFC-365mfc. In some embodiments, the composition consists of 1,2-dichloro-1,2-difluoroethylene and HFC-365mfc.

In some embodiments, the composition comprises about 1 to about 99 weight percent HFC-43-10mee, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFC-43-10mee. In some embodiments, the composition comprises about 1 to about 99 weight percent 1,2-dichloro-1,2-difluoroethylene and about 1 to about 99 weight percent HFC-43-10mee. In some embodiments, the composition consists essentially of 1,2-dichloro-1,2-difluoroethylene and HFC-43-10mee. In some embodiments, the composition consists of 1,2-dichloro-1,2-difluoroethylene and HFC-43-10mee.

In some embodiments, the composition comprises about 1 to about 99 weight percent HFO-1234ye-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1234ye-E. In some embodiments, the composition comprises about 1 to about 99 weight percent 1,2-dichloro-1,2-difluoroethylene and about 1 to about 99 weight percent HFO-1234ye-E. In some embodiments, the composition consists essentially of 1,2-dichloro-1,2-difluoroethylene and HFO-1234ye-E. In some embodiments, the composition consists of 1,2-dichloro-1,2-difluoroethylene and HFO-1234ye-E.

In some embodiments, the composition comprises about 1 to about 99 weight percent HFO-1234ye-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1234ye-Z. In some embodiments, the composition comprises about 1 to about 99 weight percent 1,2-dichloro-1,2-difluoroethylene and about 1 to about 99 weight percent HFO-1234ye-Z. In some embodiments, the composition consists essentially of 1,2-dichloro-1,2-difluoroethylene and HFO-1234ye-Z. In some embodiments, the composition consists of 1,2-dichloro-1,2-difluoroethylene and HFO-1234ye-Z.

In some embodiments, the composition comprises about 1 to about 99 weight percent HFO-1234yf, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1234yf. In some embodiments, the composition comprises about 1 to about 99 weight percent 1,2-dichloro-1,2-difluoroethylene and about 1 to about 99 weight percent HFO-1234yf. In some embodiments, the composition consists essentially of 1,2-dichloro-1,2-difluoroethylene and HFO-1234yf. In some embodiments, the composition consists of 1,2-dichloro-1,2-difluoroethylene and HFO-1234yf.

In some embodiments, the composition comprises about 1 to about 99 weight percent HFO-1234ze-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1234ze-E. In some embodiments, the composition comprises about 1 to about 99 weight percent 1,2-dichloro-1,2-difluoroethylene and about 1 to about 99 weight percent HFO-1234yf. In some embodiments, the composition consists essentially of 1,2-dichloro-1,2-difluoroethylene and HFO-1234ze-E. In some embodiments, the composition consists of 1,2-dichloro-1,2-difluoroethylene and HFO-1234ze-E.

In some embodiments, the composition comprises about 1 to about 99 weight percent HFO-1234ze-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1234ze-Z. In some embodiments, the composition comprises about 1 to about 99 weight percent 1,2-dichloro-1,2-difluoroethylene and about 1 to about 99 weight percent HFO-1234ze-Z. In some embodiments, the composition consists essentially of 1,2-dichloro-1,2-difluoroethylene and HFO-1234ze-Z. In some embodiments, the composition consists of 1,2-dichloro-1,2-difluoroethylene and HFO-1234ze-Z.

In some embodiments, the composition comprises about 1 to about 99 weight percent HFO-1243zf, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1243zf. In some embodiments, the composition comprises about 1 to about 99 weight percent 1,2-dichloro-1,2-difluoroethylene and about 1 to about 99 weight percent HFO-1243zf. In some embodiments, the composition consists essentially of 1,2-dichloro-1,2-difluoroethylene and HFO-1243zf. In some embodiments, the composition consists of 1,2-dichloro-1,2-difluoroethylene and HFO-1243zf.

In some embodiments, the composition comprises about 1 to about 99 weight percent HFO-1336mzz-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1336mzz-E. In some embodiments, the composition comprises about 1 to about 99 weight percent 1,2-dichloro-1,2-difluoroethylene and about 1 to about 99 weight percent HFO-1336mzz-E. In some embodiments, the composition comprises about 65 to about 75 weight percent 1,2-dichloro-1,2-difluoroethylene and about 35 to about 25 weight percent HFO-1336mzz-E. In some embodiments, the composition comprises about 65 to about 70 weight percent 1,2-dichloro-1,2-difluoroethylene and about 30 weight percent HFO-1336mzz-E. In some embodiments, the composition consists essentially of 1,2-dichloro-1,2-difluoroethylene and HFO-1336mzz-E. In some embodiments, the composition consists of 1,2-dichloro-1,2-difluoroethylene and HFO-1336mzz-E.

In some embodiments, the composition comprises about 1 to about 99 weight percent HFO-1336mzz-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1336mzz-Z. In some embodiments, the composition comprises about 1 to about 99 weight percent 1,2-dichloro-1,2-difluoroethylene and about 1 to about 99 weight percent HFO-1336mzz-Z. In some embodiments, the composition comprises about 10 to about 30 percent by weight 1,2-dichloro-1,2-difluoroethylene and about 90 to about 70 percent by weight HFO-1336mzz-Z. In some embodiments, the composition comprises about 15 to about 25 percent by weight 1,2-dichloro-1,2-difluoroethylene and about 85 to about 75 percent by weight HFO-1336mzz-Z. In some embodiments, the composition comprises about 40 to about 50 percent by weight 1,2-dichloro-1,2-difluoroethylene and about 60 to about 50 percent by weight HFO-1336mzz-Z. In some embodiments, the composition comprises about 45 percent by weight 1,2-dichloro-1,2-difluoroethylene and about 55 percent by weight HFO-1336mzz-Z. In some embodiments, the composition comprises about 20 percent by weight 1,2-dichloro-1,2-difluoroethylene and about 80 percent by weight HFO-1336mzz-Z. In some embodiments, the composition consists essentially of 1,2-dichloro-1,2-difluoroethylene and HFO-1336mzz-Z. In some embodiments, the composition consists of 1,2-dichloro-1,2-difluoroethylene and HFO-1336mzz-Z.

In some embodiments, the composition comprises about 1 to about 99 weight percent of a mixture of HFO-1336mzz-Z and HFO-1336mzz-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent of a mixture of HFO-1336mzz-Z and HFO-1336mzz-E. In some embodiments, the composition comprises about 15 to about 25 percent by weight 1,2-dichloro-1,2-difluoroethylene, about 50 to about 55 percent by weight HFO-1336mzz-Z, and about 25 to about 30 percent by weight HFO-1336mzz-E. In some embodiments, the composition comprises about 21 percent by weight 1,2-dichloro-1,2-difluoroethylene, about 53 percent by weight HFO-1336mzz-Z, and about 26 percent by weight HFO-1336mzz-E. In some embodiments, the composition consists essentially of 1,2-dichloro-1,2-difluoroethylene, HFO-1336mzz-Z, and HFO-1336mzz-E. In some embodiments, the composition consists of 1,2-dichloro-1,2-difluoroethylene, HFO-1336mzz-Z, and HFO-1336mzz-E.

In some embodiments, the composition comprises about 1 to about 99 weight percent HFO-1336yf, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1336yf. In some embodiments, the composition comprises about 1 to about 99 weight percent 1,2-dichloro-1,2-difluoroethylene and about 1 to about 99 weight percent HFO-1336yf. In some embodiments, the composition consists essentially of 1,2-dichloro-1,2-difluoroethylene and HFO-1336yf. In some embodiments, the composition consists of 1,2-dichloro-1,2-difluoroethylene and HFO-1336yf.

In some embodiments, the composition comprises about 1 to about 99 weight percent HFO-1336ze-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1336ze-E. In some embodiments, the composition comprises about 1 to about 99 weight percent 1,2-dichloro-1,2-difluoroethylene and about 1 to about 99 weight percent HFO-1336ze-E. In some embodiments, the composition consists essentially of 1,2-dichloro-1,2-difluoroethylene and HFO-1336ze-E. In some embodiments, the composition consists of 1,2-dichloro-1,2-difluoroethylene and HFO-1336ze-E.

In some embodiments, the composition comprises about 1 to about 99 weight percent HFO-1336ze-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1336ze-Z. In some embodiments, the composition comprises about 1 to about 99 weight percent 1,2-dichloro-1,2-difluoroethylene and about 1 to about 99 weight percent HFO-1336ze-Z. In some embodiments, the composition consists essentially of 1,2-dichloro-1,2-difluoroethylene and HFO-1336ze-Z. In some embodiments, the composition consists of 1,2-dichloro-1,2-difluoroethylene and HFO-1336ze-Z.

In some embodiments, the composition comprises about 1 to about 99 weight percent HFO-1345mzz-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1345mzz-E. In some embodiments, the composition comprises about 1 to about 99 weight percent 1,2-dichloro-1,2-difluoroethylene and about 1 to about 99 weight percent HFO-1345mzz-E. In some embodiments, the composition consists essentially of 1,2-dichloro-1,2-difluoroethylene and HFO-1345mzz-E. In some embodiments, the composition consists of 1,2-dichloro-1,2-difluoroethylene and HFO-1345mzz-E.

In some embodiments, the composition comprises about 1 to about 99 weight percent HFO-1429mzy, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1429mzy. In some embodiments, the composition comprises about 1 to about 99 weight percent 1,2-dichloro-1,2-difluoroethylene and about 1 to about 99 weight percent HFO-1429mzy. In some embodiments, the composition consists essentially of 1,2- dichloro-1,2-difluoroethylene and HFO-1429mzy. In some embodiments, the composition consists of 1,2-dichloro-1,2-difluoroethylene and HFO-1429mzy.

In some embodiments, the composition comprises about 1 to about 99 weight percent HFO-1438ezy-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1438ezy-E. In some embodiments, the composition comprises about 1 to about 99 weight percent 1,2-dichloro-1,2-difluoroethylene and about 1 to about 99 weight percent HFO-1438ezy-E. In some embodiments, the composition consists essentially of 1,2-dichloro-1,2-difluoroethylene and HFO-1438ezy-E. In some embodiments, the composition consists of 1,2-dichloro-1,2-difluoroethylene and HFO-1438ezy-E.

In some embodiments, the composition comprises about 1 to about 99 weight percent HFO-1438ezy-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1438ezy-Z. In some embodiments, the composition comprises about 1 to about 99 weight percent 1,2-dichloro-1,2-difluoroethylene and about 1 to about 99 weight percent HFO-1438ezy-Z. In some embodiments, the composition consists essentially of 1,2-dichloro-1,2-difluoroethylene and HFO-1438ezy-Z. In some embodiments, the composition consists of 1,2-dichloro-1,2-difluoroethylene and HFO-1438ezy-Z.

In some embodiments, the composition comprises about 1 to about 99 weight percent HFO-1438mzz-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1438mzz-E. In some embodiments, the composition comprises about 1 to about 99 weight percent 1,2-dichloro-1,2-difluoroethylene and about 1 to about 99 weight percent HFO-1438mzz-E. In some embodiments, the composition consists essentially of 1,2-dichloro-1,2-difluoroethylene and HFO-1438mzz-E. In some embodiments, the composition consists of 1,2-dichloro-1,2-difluoroethylene and HFO-1438mzz-E.

In some embodiments, the composition comprises about 1 to about 99 weight percent HFO-1438mzz-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-1438mzz-Z. In some embodiments, the composition comprises about 1 to about 99 weight percent 1,2-dichloro-1,2-difluoroethylene and about 1 to about 99 weight percent HFO-1438mzz-Z. In some embodiments, the composition consists essentially of 1,2-dichloro-1,2-difluoroethylene and HFO-1438mzz-Z. In some embodiments, the composition consists of 1,2-dichloro-1,2-difluoroethylene and HFO-1438mzz-Z.

In some embodiments, the composition comprises about 1 to about 99 weight percent HFO-153-10mzzy, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HFO-153-10mzzy. In some embodiments, the composition comprises about 1 to about 99 weight percent 1,2-dichloro-1,2-difluoroethylene and about 1 to about 99 weight percent HFO-153-10mzzy. In some embodiments, the composition consists essentially of 1,2-dichloro-1,2-difluoroethylene and HFO-153-10mzzy. In some embodiments, the composition consists of 1,2-dichloro-1,2-difluoroethylene and HFO-153-10mzzy.

In some embodiments, the composition comprises about 1 to about 99 weight percent HCFO-1224yd-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HCFO-1224yd-E. In some embodiments, the composition comprises about 1 to about 99 weight percent 1,2-dichloro-1,2-difluoroethylene and about 1 to about 99 weight percent HCFO-1224yd-E. In some embodiments, the composition consists essentially of 1,2-dichloro-1,2-difluoroethylene and HCFO-1224yd-E. In some embodiments, the composition consists of 1,2-dichloro-1,2-difluoroethylene and HCFO-1224yd-E.

In some embodiments, the composition comprises about 1 to about 99 weight percent HCFO-1224yd-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HCFO-1224yd-Z. In some embodiments, the composition comprises about 1 to about 99 weight percent 1,2-dichloro-1,2-difluoroethylene and about 1 to about 99 weight percent HCFO-1224yd-Z. In some embodiments, the composition consists essentially of 1,2-dichloro-1,2-difluoroethylene and HCFO-1224yd-Z. In some embodiments, the composition consists of 1,2-dichloro-1,2-difluoroethylene and HCFO-1224yd-Z.

In some embodiments, the composition comprises about 1 to about 99 weight percent HCFO-1233xf, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HCFO-1233xf. In some embodiments, the composition comprises about 1 to about 99 weight percent 1,2-dichloro-1,2-difluoroethylene and about 1 to about 99 weight percent HCFO-1233xf. In some embodiments, the composition consists essentially of 1,2-dichloro-1,2-difluoroethylene and HCFO-1233xf. In some embodiments, the composition consists of 1,2-dichloro-1,2-difluoroethylene and HCFO-1233xf.

In some embodiments, the composition comprises about 1 to about 99 weight percent HCFO-1233zd-E, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HCFO-1233zd-E. In some embodiments, the composition comprises about 1 to about 99 weight percent 1,2-dichloro-1,2-difluoroethylene and about 1 to about 99 weight percent HCFO-1233zd-E. In some embodiments, the composition comprises about 45 to about 55 weight percent 1,2-dichloro-1,2-difluoroethylene and about 55 to about 45 weight percent HCFO-1233zd-E. In some embodiments, the composition comprises about 50 weight percent 1,2-dichloro-1,2-difluoroethylene and about 50 weight percent HCFO-1233zd-E. In some embodiments, the composition consists essentially of 1,2-dichloro-1,2-difluoroethylene and HCFO-1233zd-E. In some embodiments, the composition consists of 1,2-dichloro-1,2-difluoroethylene and HCFO-1233zd-E.

In some embodiments, the composition comprises about 1 to about 99 weight percent HCFO-1233zd-Z, for example, about 1 to about 90, about 1 to about 80, about 1 to about 50, about 1 to about 25, about 1 to about 10, about 10 to about 99, about 10 to about 90, about 10 to about 80, about 10 to about 50, about 10 to about 25, about 25 to about 99, about 25 to about 90, about 25 to about 80, about 25 to about 50, about 50 to about 99, about 50 to about 90, about 50 to about 80, about 80 to about 99, about 80 to about 90, or about 90 to about 99 weight percent HCFO-1233zd-Z. In some embodiments, the composition comprises about 1 to about 99 weight percent 1,2-dichloro-1,2-difluoroethylene and about 1 to about 99 weight percent HCFO-1233zd-Z. In some embodiments, the composition consists essentially of 1,2-dichloro-1,2-difluoroethylene and HCFO-1233zd-Z. In some embodiments, the composition consists of 1,2-dichloro-1,2-difluoroethylene and HCFO-1233zd-Z.

In some embodiments, the composition comprises:
i) 1,2-dichloro-1,2-difluoroethylene; and
ii) one or more compounds selected from 2-chloropropane, n-propane, cyclopropane, n-butane, cyclobutane, iso-butane, cyclopentane, neo-pentane, water, methanol, ethanol, n-propanol, iso-propanol, dimethyl ether, ethyl methyl ether, diethyl ether, dimethoxymethane, methyl acetate, ethyl acetate, methyl formate, ethyl formate, ethylene oxide, propylene oxide, fluorinated epoxides, HFC-227ca, HFC-236ea, HFC-245ca, HFC-245eb, HFC-245cb, HFC-245ea, HFC-365mfc, HFC-4310mee HFO-1234ye-E, HFO-1234ye-Z, HFO-1243zf, HFO-1336ze-Z, HFO-1345mzz-E, HFO-1429mzy, HFO-1438ezy-E, HFO-1438ezy-Z, HFO-1438mzz-Z, HFO-153-10mzzy, HCFO-1224yd-E, HCFO-1233xf, and HCFO-1233zd-Z.

In some embodiments, the composition comprises:
i) 1,2-dichloro-1,2-difluoroethylene;
ii) one or more compounds selected from 2-chloropropane, iso-butane, cyclopentane, carbon dioxide, ethanol, dimethyl ether, methyl formate, HFC-134a, HFC-134, HFC-152a, HFC-236ea, HFC-245fa, HFO-1234yf, HFO-1234ze-E, HFO-1243zf, HFO-1336mzz-E, HFO-1336mzz-Z, HCFO-1224yd-Z, and HCFO-1233zd-E.

In some embodiments, the composition comprises:
i) 1,2-dichloro-1,2-difluoroethylene; and
ii) one or more compounds selected from HFC-134a, HFC-134, HFC-152a, dimethyl ether, carbon dioxide, HFO-1234yf, HFO-1234ze-E, HFO-1243zf, and iso-butane.

In some embodiments, the composition comprises:
i) 1,2-dichloro-1,2-difluoroethylene; and
ii) one or more compounds selected from HFC-134a, HFC-134, HFC-152a, dimethyl ether, carbon dioxide, HFO-1234yf, HFO-1234ze-E, HFO-1243zf, and iso-butane; and
iii) one or more compounds selected from HFC-245fa, HFO-1336mzz-E, HFO-1336mzz-Z, HCFO-1224yd-Z, HCFO-1233zd-E, and cyclopentane.

In some embodiments, the composition comprises:
i) 1,2-dichloro-1,2-difluoroethylene; and
ii) one or more compounds selected from HFC-152a, carbon dioxide, HFO-1234yf, and HFO-1234ze-E.

In some embodiments, the composition comprises:
i) 1,2-dichloro-1,2-difluoroethylene; and
ii) one or more compounds selected from HFC-152a, carbon dioxide, HFO-1234yf, and HFO-1234ze-E
iii) a compound selected from HFO-1336mzz-E and HFO-1336mzz-Z, or a mixture thereof.

Processes of the Invention

In some embodiments, the present application provides a process for preparing a thermoplastic polymer foam, the process comprising:
(a) providing a foamable composition comprising a thermoplastic polymer a composition provided herein (i.e., a blowing agent composition provided herein); and
(b) expanding the foamable composition to produce the thermoplastic polymer foam.

In some embodiments, the processes of the invention further comprises heating the polymer and blowing agent in the presence of one or more additives. Exemplary additives include, but are not limited to, nucleating agents, cell stabilizer agents, surfactants, preservative colorants, antioxidants, reinforcing agents, fillers, antistatic agents, IR attenuating agents, extrusion aids, plasticizers, and viscosity modifiers, or any combination thereof, in an amount to obtain the effect desired.

In some embodiments, the blowing agent provided herein is substantially free of additives. In some embodiments, the blowing agent provided herein comprises one or more additives (e.g., one, two, three, four, or five additives).

In some embodiments, the process of the invention is performed in the presence of a nucleating agent. In some embodiments, the nucleating agent is one or more nucleating agents selected from talc, graphite, and magnesium silicate.

In some embodiments, the foamable composition further comprises a flame retardant. In some embodiments, the flame retardant comprises a polymeric flame retardant or a halogenated flame retardant. In some embodiments, the flame retardant is a brominated flame retardant or a chlorinated flame retardant. In some embodiments, the flame retardant is PolyFR.

In some embodiments, the foamable composition further comprises an Infrared Attenuating Agent.

As used herein, the term "molten composition" refers to a foamable composition. The amount of blowing agent in the molten composition will depend on the amount of additives other than blowing agent and the density desired in the foamed product. In some embodiments, the amount of blowing agent in the foamable composition is from about 5 to about 20 wt %. In some embodiments, the amount of blowing agent in the foamable composition is from about 5 to about 15 wt %, based on the weight of the foamable composition. It is understood that the weight percentage of the blowing agent in the foamable composition can be adjusted based on the desired density of the foam, and the ratio of components in the blowing agent.

In some embodiments, the blowing agent is from about 5 parts to about 25 parts per hundred parts of polymer by mass, for example, about 5 to about 20, about 5 to about 15, about 5 to about 10, about 10 to about 25, about 10 to about 20, about 10 to about 15, about 15 to about 25, about 15 to about 20, or about 20 to about 25 parts per hundred parts of polymer by mass. In some embodiments, the blowing agent is from about 7 parts to about 18 parts per hundred parts of polymer by mass. In some embodiments, the blowing agent is from about 5 parts to about 15 parts per hundred parts of polymer by mass.

In some embodiments, the thermoplastic polymer provided herein is an alkenyl aromatic polymer. As used herein, the term "alkenyl aromatic polymer" refers to a polymer formed from alkenyl-aromatic monomer units. In some embodiments, the alkenyl-aromatic monomer unit is a $C_{2-6}$ alkenyl-$C_{6-10}$ aryl monomer unit. In some embodiments, the alkenyl-aromatic monomer unit is a $C_{2-6}$ alkenyl-phenyl monomer unit, wherein the phenyl is optionally substituted. In some embodiments, the alkenyl aromatic polymer is polystyrene.

The polystyrene can be styrene homopolymer or can contain copolymerized monomer other than styrene (i.e., polystyrene copolymer). In some embodiments, the thermoplastic polymer comprises a blend of polystyrene and an additional thermoplastic polymer. In some embodiments, the additional thermoplastic polymer is a copolymer of styrene with a monomer other than styrene (e.g., acrylonitrile).

In some embodiments, the thermoplastic polymer is selected from polystyrene, polyethylene, polyethylene copolymer, polypropylene, polypropylene copolymer, acrylonitrile butadiene styrene, styrene acrylonitrile copolymer, and blends thereof. In some embodiments, the thermoplastic polymer is selected from polystyrene, polyethylene, and polypropylene. In some embodiments, the thermoplastic polymer is a polyethylene-polypropylene copolymer. In some embodiments, the thermoplastic polymer is polystyrene.

Whether the thermoplastic polymer being foamed is polystyrene or blends of polystyrene with other thermoplastic polymer, styrene is preferably the dominant polymerized monomer (unit) in the thermoplastic polymer being foamed. In some embodiments, the polymerized units of styrene constitute at least 70 mol %, at least 80 mol %, at least 90 mol %, or at least 100 mol % of the polymerized monomer units of the thermoplastic polymer.

When the thermoplastic polymer contains styrene copolymer, the amount of the additional monomer copolymerized with the styrene is such that the styrene content of the copolymer is at least 60 mol % of the copolymer, at least 70 mol %, at least 80 mol %, or at least 90 mol % of the copolymer, based on the total number of moles (i.e., 100%) of the copolymer. It is understood that these ratios apply whether the styrene copolymer is the only styrene-containing polymer in the thermoplastic polymer or is a blend with other thermoplastic polymer, such as styrene homopolymer or other styrene copolymer.

In some embodiments, the thermoplastic polymer comprises styrene homopolymer (i.e., polystyrene homopolymer). When the thermoplastic polymer is a blend of polystyrene and other thermoplastic polymer as described above, the polystyrene component of this blend is preferably styrene homopolymer comprising at least 80 wt % of the combined weight of polystyrene and other thermoplastic polymer.

The molecular weight of the thermoplastic polymer comprising polystyrene being foamed is sufficiently high to provide the strength necessary for the requirements of the foam application. The strength requirement determines the minimum density of the foamed product. The high molecular weight of the thermoplastic polymer comprising polystyrene also contributes to the strength of the foamed product. An indicator of molecular weight is the rate at which the molten polymer flows through a defined orifice under a defined load. The lower the flow, the higher the molecular weight. Measurement of the melt flow rate is determined in accordance with ASTM D 1238 at 200° C. and using a 5 kg weight on the molten polymer. The weight of molten polymer flowing through the orifice in a defined amount of time, enables the melt flow rate to be reported in g/10 min. In some embodiments the melt flow rate of the thermoplastic polymer comprising polystyrene is no greater than 20 g/10 min, no greater than 15 g/10 min, or no greater than 10 g/10 min. Surprisingly the higher the molecular weight (lower the melt flow rate), the better the foaming result, especially with respect to the attainability of low density foamed products, while still achieving smooth skin on the foamed product. In some embodiments the minimum melt flow rate for all the melt flow rates disclosed herein is at least 1 g/10 min, whereby the melt flow rate ranges disclosed herein include, but are not limited to, 1 to 25, 1 to 20, 1 to 15, and 1 to 10 g/10 min. In some embodiments, the melt flow rate is about 25 g/10 min or less, as determined in accordance with the procedure of ASTM D 1238 at 200° C. using a 5 kg weight on the molten polymer.

The references to thermoplastic polymer comprising polystyrene also apply to polystyrene by itself. Thus, for example, the disclosure of thermoplastic polymer comprising polystyrene in the preceding paragraph can be replaced by the disclosure of polystyrene.

In some embodiments, the process further comprises extruding the thermoplastic polymer to form a thermoplastic polymer foam comprising the composition provided herein.

In some embodiments, the extruding is performed at a die temperature of from about 100° C. to about 150° C., for example, about 100° C. to about 140° C., about 100° C. to about 130° C., about 100° C. to about 120° C., about 100° C. to about 110° C., about 110° C. to about 150° C., about 110° C. to about 140° C., about 110° C. to about 130° C., about 110° C. to about 120° C., about 120° C. to about 150° C., about 120° C. to about 140° C., about 120° C. to about 130° C., about 130° C. to about 150° C., about 130° C. to about 140° C., or about 140° C. to about 150° C. In some embodiments, the extruding is performed at a die temperature of from about 110° C. to about 140° C. In some embodiments, the extruding is performed at a die temperature of from about 120° C. to about 130° C.

In some embodiments, the process is performed in an extruder to 1) form the foamable composition into a desired form; and 2) to extrude the foamable composition to form a thermoplastic polymer foam provided herein.

When the process of the invention is performed in an extruder, the thermoplastic polymer forms the feed to the extruder. In some embodiments the blowing agent and co-blowing agent are fed into the extruder at a location intermediate to the feed and extrusion ends of the extruder, typically into the foamable composition that is created as the extrusion screw advances the feeds along the length of the extruder. Additional additives may be added where convenient and as may be dictated by the state of the additive. For example, solid additives can be conveniently be added to the feed end of the extruder, possibly as a mixture with the polymer feed in particulate form to the extruder. The resulting foamable composition within the extruder is extruded through a die, thereby allowing the foamable composition to expand into the foamed product of a desired shape (e.g., a sheet, a plank, a rod, or a tube) and subsequently cooled.

In the region within the extruder where the composition is melted to form the molten composition, this melting occurring by the input of heat and the heat developed in the mixing process forming the melt, this is considered the melt mixing region. In some embodiments, the temperature is at least 185° C., at least 190° C., at least 200° C., or at least 210° C. In some embodiments, the maximum temperature for all the melt mixing temperatures disclosed herein is 250° C. The melt mixing temperatures disclosed herein are the temperatures of the melt in the mixing zone at the time of mixing. In some embodiments, the pressure under which the melt mixing is carried out is at least 3000 psi (207 Bar), at least 3500 psi (241 Bar), or at least 4000 psi (276 Bar). In some embodiment, the maximum value for all the minimum pressures disclosed under which the melt mixing is carried out is no greater than 5000 psi (345 Bar). The pressures disclosed herein are gauge pressures.

In the region within the extruder where the molten composition is extruded, the molten composition is cooled so that the temperature at which the extrusion is carried out is, in some embodiments at least 105° C., at least 110° C., or at least 125° C. In some embodiments, the maximum value for all the minimum extrusion temperatures disclosed herein is no greater than 140° C. The extrusion temperatures disclosed herein are the temperature of the melt at the time of extrusion.

In some embodiments, the extrusion is preferably carried out with a pressure of at least 1500 psi (103 Bar), or at least 1600 psi (110 Bar). In some embodiments the maximum value for the minimum extrusion pressures disclosed herein is no greater than 2000 psi (138 Bar). The extrusion pressure is the pressure inside the extrusion die.

In some embodiments, the process is performed at a pressure just before foaming of from about 100 psi to about 5000 psi, for example, about 100 psi to about 4000 psi, about 100 psi to about 3000 psi, about 100 psi to about 2000 psi, about 100 psi to about 1000 psi, about 1000 psi to about 5000 psi, about 1000 psi to about 4000 psi, about 1000 psi to about 3000 psi, about 1000 psi to about 2000 psi, about 2000 psi to about 5000 psi, about 2000 psi to about 4000 psi, about 2000 psi to about 3000 psi, about 3000 psi to about 5000 psi, about 3000 psi to about 4000 psi, or about 4000 psi to about 5000 psi. In some embodiments, the process is performed at a pressure just before foaming of from about 500 psi to about 4000 psi. In some embodiments, the process is performed at a pressure just before foaming of from about 800 psi to about 3000 psi. In some embodiments, the process is performed at a pressure just before foaming of from about 1000 psi to about 2500 psi.

The disclosures of multiple ranges for melt flow rate, temperature and pressure above can be used in any combination in the practice of the present invention to obtain the particular foamed structure desired. For example, in some embodiments, melt mixing pressures of 3000 to 5000 psi (207 to 345 Bar) are used for achieving low foam densities of the foamed product, and this temperature range can be used with any of the melt mixing and extrusion temperature ranges to form any of the smooth-skin, closed cell foam product densities disclosed herein. The same is true for the melt extrusion pressure range of 1500 to 2000 psi (103 to 138 Bar) together with the 3000 to 5000 psi (207 to 345 bar) pressure range for melt mixing. In some embodiments, the two pressure ranges, for melt mixing (207 to 345 Bar) and extrusion (103 to 138 bar) are used together. The melt flow rates for the polymer being foamed of no greater than 25, 20, 15, and 10, and as little as at least 1, all values being in g/10 min, can be used with any of these combinations of pressure and temperatures, depending on the foamed product result desired.

In some embodiments, when the process of the invention is performed in an extruder, the thermoplastic polymer (i.e., the foamable composition) is cooled such that the temperature at which the extrusion is performed is at least 125° C., or at least 130° C. In some embodiments, the temperature at which the extrusion is performed is a temperature less than the first temperature of the process of the invention. In some embodiments, the maximum value for all the minimum extrusion temperatures disclosed herein is about 150° C. or less. In some embodiments, the extruding is performed at a temperature of from about 100° C. to about 150° C. In some embodiments, the extruding is performed at a temperature of from about 110° C. to about 140° C.

In some embodiments, the extrusion temperature disclosed herein is the temperature of the polymer melt at the time of extrusion.

In some embodiments when the process of the invention is performed in an extruder, the extrusion is performed with a pressure of at least 1500 psi (103 Bar) or at least 1600 psi (110 Bar). In some embodiments the maximum value for the minimum extrusion pressures disclosed herein is no greater than 2000 psi (138 Bar). In some embodiments, the extruding is performed at a pressure of from about 1500 psi to about 2000 psi. In some embodiments, the extrusion pressure disclosed herein is the pressure inside the extrusion die.

In some embodiments, the extruding is performed at a pressure of from about 100 psi to about 5000 psi, for example, about 100 psi to about 4000 psi, about 100 psi to about 2000 psi, about 100 psi to about 1000 psi, about 1000 psi to about 5000 psi, about 1000 psi to about 4000 psi, about 1000 psi to about 2000 psi, about 2000 psi to about 5000 psi, about 2000 psi to about 4000 psi, or about 4000 psi to about 5000 psi.

In some embodiments, the extruding is performed at a pressure of from about 500 psi to about 4000 psi.

In some embodiments, the extruding is performed at a pressure of from about 750 psia to about 3000 psia.

In some embodiments, the extruding is performed at a pressure of from about 900 psia to about 2750 psia.

In some embodiments, the present application provides a foam product (e.g., a thermoplastic polymer foam) prepared according to one or more of the processes described herein.

In some embodiments, the foam provided herein further comprises one or more additives described herein.

It is understood that the blowing agent blends, additives, melt flow rates, temperatures, pressures, and other process parameters described herein can be used in any combination in the practice of the present invention to obtain the particular foamed structure desired.

Spray polyurethane foam (SPF) is a growing important market segment in the rigid insulation industry due to its excellent thermal performance and building envelope sealing capability. When applied, the speed and quality of the applied layers is critical for effective application and efficiency of performance parameters, including density and surface appearance. In addition, such foams are applied in situ in the buildings of interest under a variety of environmental conditions, including cold winter time temperatures. Typical physical foam expansion agents require heat to evaporate and expand. This becomes difficult in cold temperatures when the catalysis of the polyurethane polymerization is slowed, thus diminishing the only source of heat on the surface of the sprayed area. Therefore, providing a means of applying SPF with efficient lay down and under cold conditions represents a benefit for the industry.

In some embodiments, the process of preparing a foam (e.g., a thermoset foam) comprises reacting or extruding a foamable composition provided herein, under conditions effective to form a foam.

In some embodiments, the foamable composition further comprises one or more polyols. In some embodiments, one or more additives can be included in the foamable compositions described herein. For example, the foamable compositions can further comprise one or more additives that include, but are not limited to, catalysts, surfactants, flame retardants, stabilizers, preservatives, chain extenders, crosslinkers, water, colorants, antioxidants, reinforcing agents, fillers, antistatic agents, nucleating agents, smoke suppressants, and pigments.

In some embodiments, the foamable composition further comprises one or more additional components selected from at least one polyol, at least one catalyst, at least one surfactant, water, at least one flame retardant agent, and at least one nucleating agent.

In some embodiments, the foamable composition comprises at least one polyol. In some embodiments, the polyol comprises any ratio of polyester polyol to polyether polyol. One or more of each polyester polyol and polyether polyol may be used. In some embodiments, the polyol comprises a weight ratio of about 1:1 to about 2:1 polyester polyol to polyether polyol. In some embodiments, the polyol comprises a weight ratio of about 1:1 polyester polyols to polyether polyols. In some embodiments, the polyol comprises a weight ratio of about 1:1 polyester polyol to polyether polyol.

In some embodiments, the polyol is a polyester polyol. Suitable polyester polyols include those prepared by reacting a carboxylic acid and/or a derivative thereof or a polycarboxylic anhydride with a polyhydric alcohol. The polycarboxylic acids can be any of the known aliphatic, cycloaliphatic, aromatic, and/or heterocyclic polycarboxylic acids and can be substituted (e.g., with halogen atoms) and/or unsaturated. Examples of suitable polycarboxylic acids and anhydrides include oxalic acid, malonic acid, glutaric acid, pimelic acid, succinic acid, adipic acid, suberic acid, azelaic acid, sebacic acid, phthalic acid, isophthalic acid, terephthalic acid, trimellitic acid, trimellitic acid anhydride, pyromellitic dianhydride, phthalic acid anhydride, tetrahydrophthalic acid anhydride, hexahydrophthalic acid anhydride, endomethylene tetrahydrophthalic acid anhydride, glutaric acid anhydride acid, maleic acid, maleic acid anhydride, fumaric acid, and dimeric and trimeric fatty acids, such as those of oleic acid which may be in admixture with monomeric fatty acids. Simple esters of polycarboxylic acids can also be used, such as terephthalic acid dimethylester, terephthalic acid bisglycol and extracts thereof. The polyhydric alcohols suitable for the preparation of polyester polyols can be aliphatic, cycloaliphatic, aromatic, and/or heterocyclic. The polyhydric alcohols optionally can include substituents which are inert in the reaction, for example, chlorine and bromine substituents, and/or may be unsaturated. Suitable amino alcohols, such as monoethanolamine, diethanolamine or the like can also be used. Examples of suitable polyhydric alcohols include ethylene glycol, propylene glycol, polyoxyalkylene glycols (such as diethylene glycol, polyethylene glycol, dipropylene glycol and polypropylene glycol), glycerol, and trimethylolpropane.

Other suitable polyester polyols include, but are not limited to, aromatic polyester polyols, e.g., those made by transesterifying polyethylene terephthalate (PET) scrap with a glycol such as diethylene glycol, or made by reacting phthalic anhydride with a glycol. The resulting polyester polyols can be reacted further with ethylene and/or propylene oxide to form an extended polyester polyol containing additional internal alkyleneoxy groups.

In some embodiments, the polyester polyol has an average molecular weight of from about 400 g/mol to about 500 g/mol, such as from about 450 g/mol to about 475 g/mol. In some embodiments, the polyester polyol is an aromatic polyester polyol with an average hydroxyl number of from about 200 to about 325, such as from about 235 to about 265, or about 230 to about 250, or about 295 to about 315.

Exemplary polyester polyols that are commercially available include the polyester polyols Stepanpol® PS-2352 (Stepan Company, Chicago, IL), Stepanpol® PS-2502A (Stepan Company, Chicago, IL), Stepanpol® PS-2412 (Stepan Company, Chicago, IL), Stepanpol® PS-2520 (Stepan Company, Chicago, IL), Stepanpol® PS-3021 (Stepan Company, Chicago, IL), Stepanpol® PS-3024 (Stepan Company, Chicago, IL), Terol® 256 (Huntsman, The Woodlands, TX), and Terol® 925 (Huntsman, The Woodlands, TX), Terol® 250 (Huntsman, The Woodlands, TX), Terol® 305 (Huntsman, The Woodlands, TX), Terol® 563 (Huntsman, The Woodlands, TX), Terol® 649 (Huntsman, The Woodlands, TX), Terol® 1465 (Huntsman, The Woodlands, TX), Isoexter® TB-305 (COIM, West Deptford, NJ), Isoexter® TB-306 (COIM, West Deptford, NJ), Terate® HT5510 (Invista), Terate® 5232 (Invista), Terate® 5100 (Invista), Terate® 5150 (Invista), Terate® 5170 (Invista), Carpol® PES-240 (Carpenter Co., Richmond, VA), Carpol® PES-265 (Carpenter Co., Richmond, VA), Carpol® PES-305 (Carpenter Co., Richmond, VA), Carpol® PES-295 (Carpenter Co., Richmond, VA), In some embodiments, the foamable composition comprises one or more polyether polyols. Examples of suitable polyether polyols include, but are not limited to, polyethylene oxides, polypropylene oxides, mixed polyethylene-propylene oxides with terminal hydroxyl groups, among others. Other suitable polyols can be prepared by reacting ethylene and/or propylene oxide with an initiator having 2 to 16 or 3 to 8 hydroxyl groups as present, for example, in glycerol, pentaerythritol and carbohydrates such as sorbitol, glucose, sucrose and the like polyhydroxy compounds. Suitable polyether polyols can also include aliphatic or aromatic amine-based polyols. Exemplary polyether polyols that are commercially available include the polyether polyols JEFFOL® PPG-400, JEFFOL® PPG-1000, JEFFOL® FX31-240, JEFFOL® G31-28, JEFFOL® R-425X, JEFFOL® R-470X, JEFFOL® S-490, JEFFOL® SG-360, JEFFOL® SG-522, Carpol® PGP-400, Carpol® PGP-1000, Carpol® GP-700, Carpol® GP-6015, Carpol® MX-425, Carpol® MX-470, Carpol® GSP-355, Carpol® GSP-520, Carpol® SP-477, VORANOL® 220-260, VORANOL® 220-110, VORANOL® 230-238, VORANOL® 232-027, VORANOL® 470, VORANOL® 360, VORANOL® 520, VORANOL® 391, Pluracol® P410R, Pluracol® P1010, Pluracol® GP730, Pluracol® 220, Lupranol® 3422, Pluracol® SG-360, Pluracol® 824, Pluracol® 735, ARCOL® PPG-425, ARCOL® 1000, ARCOL® LHT-240, MULTRANOL® 9139, MULTRANOL® 3901, MULTRANOL® 4034, Poly-G®, 20-265, Poly-G®, 20-112, Poly-G®, 30-240, Poly-G®, 85-29, Poly-G®, 73-490, Poly-G®, 74-376, Poly-G®, and 74-532.

In some embodiments, the polyether polyol is a medium functional polyether polyol. For example, the polyether polyol has a functionality of about four. In some embodiments, the polyether polyol is sucrose/glycerin initiated. In some embodiments, the polyether polyol is a Mannich-based polyether polyol. As used herein, the term "Mannich-based polyol" refers to an aromatic polyol obtained by alkoxylation with propylene oxide and/or ethylene oxide of the Mannich bases obtained by classical Mannich reaction between phenols (e.g., phenol, p-nonylphenol), formaldehyde and alkanolamines (diethanolamine, diisopropanolamine, monoethanolamine, monoisopropanolamine, etc.). Exemplary commercially available polyether polyols include Voranol® 490 (Dow Chemical, Midland, MI), Carpol® MX-425 (Carpenter Co., Richmond, VA), and Carpol® MX-470 (Carpenter Co., Richmond, VA).

In some embodiments, the polyol is a polyester polyol having a hydroxyl number of from about 200 mg KOH/g to about 300 mg KOH/g.

In some embodiments, the polyol is a polyester polyol having a hydroxyl number of from about 230 mg KOH/g to about 250 mg KOH/g.

In some embodiments, the composition described herein is soluble in the polyol blend. In some embodiments, solubility is measured by visual assessment.

In some embodiments, the foamable composition comprises at least one catalyst for the reaction of the polyol with the polyisocyanate (i.e., the A-side). Any suitable urethane catalyst can be used, including amine-based compounds, such as tertiary amine compounds, for example, dimethylethanolamine and bis(2-dimethylamino ethyl) ether, and organometallic compounds. Such catalysts are used in an amount which increases the rate of reaction of the polyisocyanate. By way of example, typical amounts of catalyst used are about 0.1 to about 5 parts of catalyst per 100 parts by weight of polyol. In some embodiments, the foamable compositions comprise a gel catalyst, such as a non-nucleophilic gel catalyst. In some embodiments, the foamable compositions comprise a blow catalyst. In some embodiments, the foamable compositions comprise a metal catalyst. In some embodiments, the foamable composition comprises a metal catalyst and an amine catalyst.

Exemplary catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine salts, may also optionally be employed herein. Such catalysts are used in an amount which measurably increases the rate of reaction of the polyisocyanate. Typical amounts of catalysts are about 0.1% to about 5% by weight based on the total weight of all foaming ingredients. Non-limiting examples of catalysts include POLYCAT® 8, N,N-dimethylcyclohexylamine from Evonik Industries, POLYCAT® 5, pentamethyldiethylenetriamine from Evonik Industries, and CURITHANE® 52, 2-methyl(n-methyl amino b-sodium acetate nonyl phenol) from Evonik Industries, POLYCAT® 30, POLYCAT® 36, POLYCAT® 46, POLYCAT® 77, Dabco® 2039, Dabco® 204, Dabco® 2040, Dabco® BL-19, Dabco® BL-17, Dabco® T, Dabco® T-125, Dabco® K-15, Dabco® TMR, Dabco® TMR-2, Dabco® TMR-3, Dabco® TMR-30, Bicat® 8210, Bicat® 8840, Bicat® 8842, K-Kat® XK 651, K-Kat® 614, K-Kat® 672, K-Kat® 604, Niax® UL1, Niax® UL22, Niax® UL1, Jeffamine® D-230, Jeffamine® T403, Jeffamine® D2000, Jeffamine® T5000, Jeffcat® PMDETA, Jeffcat® DMCHA, ZF20, ZF54, tin, dibutyltin mercaptide, potassium octoate, potassium acetate, bismuth, bismuth carboxylate mixtures, and the like.

In some embodiments, the foamable composition comprises a surfactant. Suitable surfactants can comprise a liquid or solid organosilicone compound. Other surfactants include polyethylene glycol ethers of long chain alcohols, tertiary amine or alkanolamine salts of long chain alkyl acid sulfate esters, alkyl sulfonic esters, and alkyl arylsulfonic acids. In some embodiments, the surfactant is a silicone surfactant. In some embodiments, the surfactant is a silicone polyether surfactant. In some embodiments, the surfactant is Dabco® DC5585.

In some embodiments, the foamable composition comprises a flame retardant agent. Useful flame retardant agents include, but are not limited to, tris(2-chloroethyl) phosphate, tris(2-chloropropyl) phosphate, tris(1-chloro-2-propyl) phosphate (TCPP), tris(2,3-dibromopropyl) phosphate, tris (1,3-dichloropropyl) phosphate, diammonium phosphate, halogenated aromatic compounds, antimony oxide, aluminum trihydrate, polyvinyl chloride, bromine-containing diester/ether diols of tetrabromophthalic anhydride, such as a mixed ester of tetrabromophthalic anhydride with diethylene glycol and propylene glycol. Exemplary commercially available flame retardant agents include Saytex® RB-79, a reactive bromine-containing diester/ether diol of tetrabromophthalic anhydride (Albemarle Corporation, Baton Rouge, LA). In some embodiments, the flame retardant agent is tris(1-chloro-2-propyl) phosphate (TCPP).

In some embodiments, the foamable composition comprises a nucleating agent. Nucleating agents serve primarily to increase cell count and decrease cell size in the foam, and can be used in an amount of about 0.1 to about 10 parts by weight per 100 parts by weight of the resin. Typical nucleating agents comprise at least one member selected from the group consisting of talc, sodium bicarbonate-citric acid mixtures, calcium silicate, and carbon dioxide, among others. In some embodiments, the foamable composition does not comprise a nucleating agent. In some embodiments, the processes provided herein are performed in the absence of a nucleating agent. Exemplary nucleating agents include, but art not limited to, talc, sodium bicarbonate-citric acid mixtures, calcium silicate, carbon dioxide, and the like.

In some embodiments, the foamable composition comprises water.

In some embodiments, the method of process of forming a foam comprises: (a) adding a foamable disclosed herein (e.g., a B-side composition) to a composition comprising an isocyanate (e.g., an A-side composition); and (b) reacting the compositions under conditions effective to form a foam. The isocyanate or isocyanate-containing mixture can include the isocyanate and auxiliary chemicals, like catalysts, surfactants, stabilizers, chain extenders, cross-linkers, water, fire retardants, smoke suppressants, pigments, coloring materials, fillers, etc. In some embodiments, the isocyanate is PAPI-27. Any of the methods well known in the art, such as those described in "Polyurethanes Chemistry and Technology," Volumes I and II, Saunders and Frisch, 1962, John Wiley and Sons, New York, N.Y., which is incorporated herein by reference, can be used or adapted for use in accordance with the compositions disclosed herein.

In the process of making a polyisocyanate-based foam, the polyol(s), polyisocyanate, and other components are contacted, thoroughly mixed, and permitted to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and polyols. For example, it is often useful to prepare the foamable composition (e.g., the B-side composition) disclosed herein, and then contact this composition with the polyisocyanate.

In some embodiments, the foamable composition provided herein (e.g., a B-side composition) can be used to blow thermoplastic foams, such as polystyrene, polyethylene foams, including low-density polyethylene foams, or polypropylene foams. Any of a wide range of conventional methods for blowing such thermoplastic foams can be adapted for use herein. Thus, disclosed herein are thermoplastic foams, such as polystyrene, polyethylene (PE), for example, low density PE, or polypropylene (PP), formed using the foamable compositions disclosed herein.

The thermoplastic foam bodies can be produced using conventional equipment comprising an extruder and associated means for (1) melting the resin; (2) homogeneously blending the foamable composition described herein (e.g., the B-side composition) with the melt to form a plasticized mass at non-foaming temperatures and pressures; (3) passing the plasticized mass at a controlled rate, temperature and pressure through a die having a desired shape, e.g., slit die for producing rectangular slabs of foam board having desired thickness and surface area, into an expansion zone; (4) allowing the extrudate to foam in the expansion zone maintainable at suitable temperatures and low pressures; (5) maintaining the expanding extrudate under such temperatures and pressures for a time sufficient for the viscosity of the extrudate to increase such that the cell size and density of the foam remain substantially unchanged and substantially free of ruptured cells at ambient temperature, e.g., 25° C. and atmospheric pressure; and (6) recovering the extruded foam body.

It is understood that the present application further provides a foamable composition as described herein. In some embodiments, the foamable composition described herein is useful in one or more of the processes described herein.

In some embodiments, the present application provides processes of reducing or eliminating the flammability of a flammable blowing agent (e.g., a compound or blowing agent composition). In some embodiments, the present application provides a method for reducing the flammability of a flammable blowing agent comprising adding 1,2-dichloro-1,2-difluoroethylene and/or a composition provided herein to the flammable blowing agent.

As used herein, the term "flammability" refers to the ability of a compound or composition to ignite and/or propagate a flame. The lower flammability limit ("LFL") is the minimum concentration of the compound or composition in air that is capable of propagating a flame through a homogeneous mixture of the compound or composition and air under test conditions specified in ASTM (American Society of Testing and Materials) E681. The upper flammability limit ("UFL") is the maximum concentration of the compound or composition in air that is capable of propagating a flame through a homogeneous mixture of the compound or composition and air under the same test conditions.

Foams of the Invention

The present application further provides a foam prepared according to one or more processes provided herein (e.g., a thermoplastic or a thermoset foam). The types of foam produced can include, for example, closed cell foams, open cell foams, rigid foams, flexible foams, and integral skin. In some embodiments, disclosed herein are foams prepared from the foamable compositions (e.g., B-side compositions). In some embodiments, the foam is a spray foam. In some embodiments, the foam is a thermoset foam. In some embodiments, the foam is a thermoplastic foam.

In some embodiments, the foam is a polyurethane foam or a polyisocyanurate foam. In some embodiments, the foam is a closed cell foam. In some embodiments, the foam is a closed cell polyisocyanurate foam. In some embodiments, the foam is a rigid closed cell polyisocyanurate foam. In some embodiments, the foam is a rigid closed cell polyurethane foam. In some embodiments, the rigid closed-cell celled polyisocyanate-based foams are useful in spray insulation, as foam-in-place appliance foams, rigid insulating board stock, or in laminates.

In some embodiments, the foams disclosed herein can be used in a wide variety of applications, including, but not limited to, appliance foams including refrigerator foams, freezer foams, refrigerator/freezer foams, panel foams, and other cold or cryogenic manufacturing applications. In some embodiments, the foams formed from the compositions disclosed herein have exceptional thermal performance, such as can be measured by the K-factor. "K-factor," as used herein, represents the foam's thermal conductivity or ability to conduct heat. The K-factor is a measure of heat that passes through one square foot of material that is one-inch-thick in one hour. Typically, the lower the K-factor, the better the insulation.

In some embodiments, the foams produced from the foamable compositions disclosed herein have a density of from about 2.5 to about 3.5 $g/cm^3$. For example, the foam can have a density of about 2.5, 2.6, 2.7, 2.8, 2.9, 3.0, 3.1, 3.2, 3.3, 3.4, or 3.5 $g/cm^3$.

Representative foamed products that can be made in accordance with the present disclosure include, for example: (1) polystyrene foam sheet for the production of disposable thermoformed packaging materials, e.g., as disclosed in U.S. Pat. No. 5,204,169; (2) extruded polystyrene foam boards for use as residential and industrial sheathing and roofing materials, which may be from about 0.5 to 6 inches (1.25 to 15 cm) thick, up to 4 feet (122 cm) wide, with cross-sectional areas of from 0.17 to 3 square feet (0.016 to 0.28 square meter), and up to 27 feet (813 meters) long, with densities of from about 1.5 to 10 pounds per cubic foot (pcf) (25 to 160 kilograms per cubic meter ($kg/m^3$); (3) expandable foams in the form of large billets which may be up to about 2 feet (61 cm) thick, often at least 1.5 feet 46 cm) thick, up to 4 feet (1.22 meters) wide, up to 16 feet (4.8 meters) long, having a cross-sectional area of about 2 to 8 square feet (0.19 to 0.74 square meter) and a density of from 6 to 15 pcf (96 to 240 $kg/m^3$). Such foamed products are more fully described by Stockdopole and Welsh in the Encyclopedia of Polymer Science and Engineering, vol. 16, pages 193-205, John Wiley & Sons, 1989; hereby incorporated by reference.

In some embodiments, the polymer foams (e.g., thermoplastic or thermoset polymer foams) provided herein comprise one or more of the following properties:

Closed cells—at least 70%, at least 80%, at least 90%, or at least 95%. Closed cell content can be measured according to ASTM method D6226-05.

Average Cell Size: From about 0.005 mm to about 5 mm (i.e., 5 μm to about 5000 μm), for example, about 0.01 mm to about 5 mm, about 0.05 mm to about 5 mm, about 0.05 mm to about 0.5 mm. In some embodiments, the average cell size is from about 0.01 mm to about 1 mm. In some embodiments, the average cell size is from about 0.02 mm to about 0.5 mm. In some embodiments, the average cell size is from about 0.1 mm to about 0.3 mm.

Density no greater than about 40 kg/m3, no greater than about 35 kg/m3, or no greater than about 23 kg/m3. Density can be measured according to ISO method 845 85.

Smooth skin.

Substantially free of blowholes.

EXAMPLES

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

Example 1. Solubility of an HFO-1336mzz(Z)/CFO-1112 Blend in Softened Polystyrene Homo-Polymer A blowing agent for the expansion of thermoplastic foam (e.g., polystyrene foam) must be sufficiently soluble in the molten thermoplastic polymer (e.g., polystyrene resin) under foam formation conditions so that an adequate volume of the blowing agent is available during the foam expansion and cooling phase to form cells and reduce the effective foam density to the target value. Expansion agent present in excess of its solubility could lead to foam defects.

The solubility of HFO-1336mzz(Z) and an HFO-1336mzz(Z)/CFO-1112 blend containing 20 wt % CFO-1112 (mixture of Z-/E-stereoisomers) in softened polystyrene were determined by the following procedure: approximately 78 g of polystyrene were loaded into a 125 cc stainless steel Parr© reactor. The reactor was weighed, mounted to inlet/outlet piping, immersed in an oil bath, and evacuated. An HIP pressure generator (High Pressure Equipment Company) was used to load an amount of blowing agent in excess of its expected solubility into the evacuated reactor. The oil bath was heated and kept at a temperature of 179° C. for 30 minutes before the final pressure was recorded. The Parr© reactor was removed from the oil bath and cooled down to room temperature. The reactor (with re-solidified polystyrene inside) was weighed after excess (non-dissolved in the polystyrene) blowing agent was drained or vented. The weight gain was recorded as solubility according to Equation 1, where phr stands for Parts (or gr) of blowing agent dissolved per one Hundred parts (or gr) of Resin.

solubility (in phr)=(resin weight gain÷78)×100,   Equation 1.

The resulting data are shown in FIG. 1, which shows that, surprisingly, the HFO-1336mzz(Z)/CFO-1112 blend containing 20 wt % CFO-1112 exhibited significantly higher solubility in polystyrene than neat HFO-1336mzz(Z).

Example 2. HFC-152a Flammability Reduction and Suppression Through Blending with CFO-1112

The flammability of mixtures of HFC-152a and CFO-1112 at 60° C. was tested according to ASTM E681-2009 Annex-A1 "Test method for materials with large quenching distances, which may be difficult to ignite". The air used in the flammability tests had a humidity of 0.0088 gm water vapor/gm dry air which corresponds to 50% relative humidity at 23.0° C. and 1 atm. Table 1 shows that increasing CFO-1112 content in HFC-152a/CFO-1112 mixtures increases the measured Lower Flammability Limit (LFL) of the mixture. CFO-1112 content in a HFC-152a/CFO-1112 mixture equal or greater than 89.90 wt % renders the mixture non-flammable.

TABLE 1

| Amount of CFO-1112 in HFC-152a/CFO-1112 Mixture (wt %) | HFC-152a/CFO-1112 Mixture Lower Flammability Limit |
| --- | --- |
| 21.64 | 4.75 |
| 59.46 | 7.30 |
| 85.00 | 16.50 |
| 87.05 | 17.00 |
| 89.90 | Non-Flammable |

Example 3. CFO-1112 Blowing Agent for Polyurethane Foam

Formulations were prepared following the parts per hundred polyol (pphp) method (i.e., parts by weight (pbw)). The formulations had an ISO index of 106. Components used in preparing the polyurethane foamable composition are shown below in Table 2.

TABLE 2

| Component | OH# | Wt % |
| --- | --- | --- |
| Terol 1465 | 295 | 47.0 |
| Carpol MX 470 | 470 | 22.0 |
| Voranol 490 | 490 | 6.60 |
| TCPP | 1 | 7.0 |
| PHT4 Diol/RB79 | 210 | 3.0 |
| Dabco DC193 | 1 | 0.50 |
| Polycat 5 | 1 | 1.00 |
| Polycat 30 | 1 | 1.30 |
| Dabco 2039 | 1 | 0.20 |
| Polycat 41 | 1 | 0.40 |
| Dabco T120 | 1 | 0.10 |
| Water | 6233 | 1.90 |
| CFO-1112 |  | 9 |

The B-side components were weighed on a mass balance and mixed together in a 1 L plastic beaker. The B-side, minus the blowing agent (i.e., CFO-1112), was then chilled in a 4° C. refrigerator overnight. Then the physical blowing agent was chilled down below 10° C. After cooling the blowing agent, it was added to the B-side mixture until fully incorporated. The isocyanate (A-side), primarily PAPI 27, was weighed in a 500 mL plastic beaker with an extra 15 wt % for sufficient head-room pouring, and poured into the B-side mixture. The A+B mixture was placed into a mixing head and mixed for 3 s at 4000 rpm. After mixing, the mixed A+B solution was quickly poured into a wax coated cardboard box and a timer was started. The resulting foams were placed under an air-hood for 24 hours to complete the polyurethane reaction. The foam was then cut into 8"×8"× 1.5" blocks. The foam blocks were tested for thermal conductivity utilizing a heat flow meter per ASTM C-518. After testing, data values were compiled for analysis and are shown below in Table 3.

TABLE 3

| Property | Measured Value |
|---|---|
| Density (pcf) | 2.46 |
| Closed Cell Content (in %) | 87.40 |
| Compressive Strength (kPa) | 262.67 |
| Core Deformation (in %) | 4.4 |
| Initial K-Factor (Btu in/ft$^2$h ° F.) | 0.1514 |

Example 4. Comparison of CFO-1112 and Blends of CFO-1112 for Preparing Polyurethane Foam Formulations were prepared following on a weight percent basis. The formulations had an ISO index of 106. Components used in preparing the polyurethane foamable compositions 4A-4E are shown below in Table 4, with the amount of blowing agent component described in Table 5. The amount of blowing agent used in foamable compositions 4A-4E were normalized (on a molar basis) relative to 14 weight percent HFO-1336mzz-Z as a representative formulation as described in Table 4.

TABLE 4

| Component | OH# | Wt % |
|---|---|---|
| Terol 1465 | 295 | 46.0 |
| Carpol MX 470 | 470 | 14.2 |
| Voranol 490 | 490 | 7.5 |
| TCPP | 1 | 10.0 |
| Dabco PM 301 | 300 | 3.0 |
| Dabco DC193 | 1 | 0.50 |
| Polycat 5 | 1 | 1.00 |
| Polycat 30 | 1 | 1.30 |
| Dabco 2039 | 1 | 0.20 |
| Polycat 41 | 1 | 0.40 |
| Dabco T120 | 1 | 0.10 |
| Water | 6233 | 1.80 |

The B-side components were weighed on a mass balance and mixed together in a 1 L plastic beaker. The B-side, minus the blowing agents, was then chilled in a 4° C. refrigerator overnight. Then the physical blowing agent was chilled down below 10° C. After cooling the blowing agent, it was added to the B-side mixture until fully incorporated. The isocyanate (A-side), primarily PAPI 27, was weighed in a 500 mL plastic beaker with an extra 15 wt % for sufficient head-room pouring, and poured into the B-side mixture. The A+B mixture was placed into a mixing head and mixed for 3 s at 4000 rpm. After mixing, the mixed A+B solution was quickly poured into a wax coated cardboard box and a timer was started. The resulting foams were placed under an air-hood for 24 hours to complete the polyurethane reaction. The foam was then cut into 8"×8"×1.5" blocks. The foam blocks were tested for thermal conductivity utilizing a heat flow meter per ASTM C-518. After testing, data values were compiled for analysis and are shown below in Tables 5-6.

TABLE 5

| Foamable Composition | Blowing Agent | Blowing Agent in B-Side (wt %) | Foam Density (Pcf) | Closed Cell Content (%) |
|---|---|---|---|---|
| 4A | CFO-1112/ HFO-1336mzz-Z | 5.7/7 | 2.34 | 92.1 |
| 4B | CFO-1112/ HFO-1336mzz-E | 8.5/3.5 | 2.13 | 87.2 |
| 4C | CFO-1112/ HCFO-1233zd-E | 5.7/5.6 | 2.25 | 90.0 |
| 4D | HFO-1336mzz-Z/ HFO-1336mzz-E/ CFO-1112 | 7/3.5/2.84 | 2.17 | 94.1 |
| 4E | CFO-1112 | 11.40 | 2.46 | 87.40 |

TABLE 6$^a$

| Foamable Composition | Initial k-factor | 30 Day k-factor | 60 Day k-factor | 90 Day k-factor | 120 Day k-factor | 150 Day k-factor | 180 Day k-factor | 210 Day k-factor |
|---|---|---|---|---|---|---|---|---|
| 4A | 0.1345 | 0.1405 | 0.1421 | 0.1452 | 0.1502 | 0.1545 | 0.1574 | 0.1597 |
| 4B | 0.1349 | 0.1451 | 0.1538 | 0.1603 | 0.1647 | 0.1685 | 0.1704 | 0.1725 |
| 4C | 0.1343 | 0.1444 | 0.1513 | 0.1602 | 0.1671 | 0.1723 | 0.1757 | 0.1785 |
| 4D | 0.1356 | 0.1396 | 0.1424 | 0.1465 | 0.1506 | 0.1539 | 0.1562 | 0.1579 |
| 4E | 0.1514 | 0.1588 | 0.1611 | 0.1653 | 0.1698 | 0.1735 | 0.175 | 0.1783 |

$^a$K-factor values shown in Btu in/ft$^2$h ° F.

These data show that blends of additional HFOs/HCFOs with CFO-1112 can be more effective at delivering initial and aged k-factors. As shown in Table 5, the closed cell contents were also improved, and lower densities were observed, for example, when using equal molar basis of blowing agents.

OTHER EMBODIMENTS

1. In some embodiments, the present application provides a process for preparing a thermoplastic polymer foam, the process comprising:
   (a) providing a foamable composition comprising a thermoplastic polymer and a blowing agent, wherein the blowing agent comprises
      i) 1,2-dichloro-1,2-difluoroethylene; and
      ii) one or more compounds selected from 2-chloropropane, trans-1,2-dichloroethylene, n-propane, cyclopropane, n-butane, cyclobutane, iso-butane, n-pentane, cyclopentane, iso-pentane, neo-pentane, carbon dioxide, nitrogen, argon, water, methanol, ethanol, n-propanol, iso-propanol, dimethyl ether, ethyl methyl ether, diethyl ether, dimethoxymethane, methyl acetate, ethyl acetate, methyl formate, ethyl formate, ethylene oxide, propylene oxide, fluorinated epoxides, HFC-32, HFC-134a, HFC-134, HFC-152a, HFC-227ca, HFC-227ea, HFC-236ea, HFC-245ca, HFC-245eb, HFC-245cb, HFC-245ea, HFC-245fa, HFC-365mfc, HFC-43-10mee HFO-1234ye-E, HFO-1234ye-Z, HFO-1234yf, HFO-1234ze-E, HFO-1234ze-Z, HFO-1243zf, HFO-1336mzz-E, HFO-1336mzz-Z, HFO-1336yf, HFO-1336ze-E, HFO-1336ze-Z, HFO-1345mzz-E, HFO-1429mzy, HFO-1438ezy-E, HFO-1438ezy-Z, HFO-1438mzz-E, HFO-1438mzz-Z, HFO-153-10mzzy, HCFO-1224yd-E, HCFO-1224yd-Z, HCFO-1233xf, HCFO-1233zd-E, and HCFO-1233zd-Z; and (b) expanding the foamable composition to produce the thermoplastic polymer foam.

2. The process of embodiment 1, wherein the blowing agent comprises:
   i) 1,2-dichloro-1,2-difluoroethylene;
   ii) one or more compounds selected from 2-chloropropane, iso-butane, cyclopentane, carbon dioxide, ethanol, dimethyl ether, methyl formate, HFC-134a, HFC-134, HFC-152a, HFC-236ea, HFC-245fa, HFO-1234yf, HFO-1234ze-E, HFO-1243zf, HFO-1336mzz-E, HFO-1336mzz-Z, HCFO-1224yd-Z, and HCFO-1233zd-E.

3. The process of embodiment 1, wherein the blowing agent comprises:
   i) 1,2-dichloro-1,2-difluoroethylene; and
   ii) one or more compounds selected from HFC-134a, HFC-134, HFC-152a, dimethyl ether, carbon dioxide, HFO-1234yf, HFO-1234ze-E, HFO-1243zf, and iso-butane.

4. The process of any one of embodiments 1 to 3, wherein the blowing agent further comprises:
   iii) one or more compounds selected from HFC-245fa, HFO-1336mzz-E, HFO-1336mzz-Z, HCFO-1224yd-Z, HCFO-1233zd-E, and cyclopentane.

5. The process of embodiment 1, wherein the blowing agent comprises:
   i) 1,2-dichloro-1,2-difluoroethylene; and
   ii) one or more compounds selected from HFC-152a, carbon dioxide, HFO-1234yf, and HFO-1234ze-E.

6. The process of any one of embodiments 1 to 3 and 5, wherein the blowing agent further comprises:
   iii) a compound selected from HFO-1336mzz-E and HFO-1336mzz-Z, or a mixture thereof.

7. The process of embodiment 1, wherein the blowing agent comprises 1,2-dichloro-1,2-difluoroethylene and HFO-1336mzz-Z.

8. The process of embodiment 1 or 7, wherein the blowing agent comprises about 20 percent by weight 1,2-dichloro-1,2-difluoroethylene and about 80 percent by weight HFO-1336mzz-Z.

9. The process of any one of embodiments 1 to 8, wherein the thermoplastic polymer is an alkenyl aromatic polymer.

10. The process of any one of embodiments 1 to 8, wherein the thermoplastic polymer is selected from the group consisting of polystyrene, polyethylene, polyethylene copolymer, polypropylene, polypropylene copolymer, acrylonitrile butadiene styrene, and styrene acrylonitrile copolymer, and blends thereof 11. The process of any one of embodiments 1 to 8, wherein the thermoplastic polymer is selected from the group consisting of a polystyrene homopolymer, a polystyrene copolymer, styrene-acrylonitrile copolymer, and blends thereof.

12. The process of any one of embodiments 1 to 11, wherein the process is performed at a pressure just before foaming of from about 100 psi to about 5000 psi.

13. The process of any one of embodiments 1 to 12, further comprising extruding the foamable composition containing the thermoplastic polymer to form the thermoplastic polymer foam.

14. The process of embodiment 13, wherein the extruding is performed at a die temperature of from about 100° C. to about 150° C.

15. The process of any one of embodiments 1 to 14, wherein the polymer foam is a closed cell polymer foam.

16. The process of any one of embodiments 1 to 15, wherein the polymer comprises at least 70% closed cells.

17. The process of any one of embodiments 1 to 16, wherein the polymer foam is a smooth skin polymer foam.

18. The process of any one of embodiments 1 to 17, wherein the polymer foam is substantially free of blowholes.

19. The process of any one of embodiments 1 to 18, wherein the polymer is a polystyrene homopolymer.

20. The process of any one of embodiments 1 to 19, wherein the foamable composition further comprises one or more additives selected from a nucleating agent, flame retardant, infrared attenuating agent, blowing agent stabilizer, cell stabilizer agent, surfactant, preservative colorant, antioxidant, reinforcing agent, filler, antistatic agent, extrusion aid, plasticizer, and viscosity modifier.

21. The process of any one of embodiments 1 to 20, wherein the blowing agent is from about 1 part to about 25 parts per hundred parts of polymer by mass.

22. In some embodiments, the present application provides a thermoplastic polymer foam, comprising:
   (a) a thermoplastic polymer selected from the group consisting of polystyrene homopolymer, a polystyrene copolymer, and styrene-acrylonitrile copolymer, or a blend thereof; and
   (b) a blowing agent comprising:
      i) 1,2-dichloro-1,2-difluoroethylene; and
      ii) one or more compounds selected from 2-chloropropane, trans-1,2-dichloroethylene, n-propane, cyclopropane, n-butane, cyclobutane, iso-butane, n-pentane, cyclopentane, iso-pentane, neo-pentane, carbon dioxide, nitrogen, argon, water, methanol, ethanol, n-propanol, iso-propanol, dimethyl ether, ethyl methyl ether, diethyl ether, dimethoxymethane, methyl acetate, ethyl acetate, methyl formate, ethyl formate, ethylene oxide, propylene oxide, fluorinated epoxides, HFC-32, HFC-134a, HFC-134, HFC-152a, HFC-227ca, HFC-227ea, HFC-236ea, HFC-245ca, HFC-245eb, HFC-245cb, HFC-245ea, HFC-245fa, HFC-365mfc, HFC-43-10mee HFO-1234ye-E, HFO-1234ye-Z, HFO-1234yf, HFO-1234ze-E, HFO-1234ze-Z, HFO-1243zf, HFO-1336mzz-E, HFO-1336mzz-Z, HFO-1336yf, HFO-1336ze-E, HFO-1336ze-Z, HFO-1345mzz-E, HFO-1429mzy, HFO-1438ezy-E, HFO-1438ezy-Z, HFO-1438mzz-E, HFO-1438mzz-Z, HFO-153-10mzzy, HCFO-1224yd-E, HCFO-1224yd-Z, HCFO-1233xf, HCFO-1233zd-E, and HCFO-1233zd-Z.

23. The thermoplastic polymer foam of embodiment 22, wherein the blowing agent comprises 1,2-dichloro-1,2-difluoroethylene and HFO-1336mzz-Z.
24. The thermoplastic polymer foam of embodiment 22 or 23, wherein the polymer foam has a density of less than about 64 kg/m$^3$, according to ISO method 845-85.
25. The thermoplastic polymer foam of embodiment 22 or 23, wherein the polymer foam has a density of less than about 40 kg/m$^3$, according to ISO method 845-85.
26. The thermoplastic polymer foam of embodiment 22 or 23, wherein the polymer has a melt flow rate of less than about 25 g/10 min.
27. The thermoplastic polymer foam of any one of embodiments 22 to 26, which is a closed cell polymer foam.
28. The thermoplastic polymer foam of any one of embodiments 22 to 27, which is a smooth skin polymer foam.
29. The thermoplastic polymer foam of any one of embodiments 22 to 28, wherein the polymer foam is substantially free of blowholes.
30. The thermoplastic polymer foam of any one of embodiments 22 to 29, wherein the foam comprises at least 70% closed cells.
31. The thermoplastic polymer foam of any one of embodiments 22 to 30, wherein the average cell size of the foam is from about 1 micrometers to about 5,000 micrometers.
32. The thermoplastic polymer foam of any one of embodiments 22 to 31, wherein the average cell size of the foam is from about 100 micrometers to about 1,000 micrometers.
33. The thermoplastic polymer foam of any one of embodiments 22 to 32, wherein the foam is a polystyrene foam.
34. The thermoplastic polymer foam of any one of embodiments 22 to 33, wherein the foam has a density of about 30 kg/m$^3$ or less.
35. In some embodiments, the present application provides a process for preparing a polymer foam, the process comprising reacting or extruding a foamable composition comprising a polymer and a blowing agent under conditions effective to form a foam, wherein the blowing agent comprises:
    i) 1,2-dichloro-1,2-difluoroethylene; and
    ii) one or more compounds selected from 2-chloropropane, trans-1,2-dichloroethylene, n-propane, cyclopropane, n-butane, cyclobutane, iso-butane, n-pentane, cyclopentane, iso-pentane, neo-pentane, carbon dioxide, nitrogen, argon, water, methanol, ethanol, n-propanol, iso-propanol, dimethyl ether, ethyl methyl ether, diethyl ether, dimethoxymethane, methyl acetate, ethyl acetate, methyl formate, ethyl formate, ethylene oxide, propylene oxide, fluorinated epoxides, HFC-32, HFC-134a, HFC-134, HFC-152a, HFC-227ca, HFC-227ea, HFC-236ea, HFC-245ca, HFC-245eb, HFC-245cb, HFC-245ea, HFC-245fa, HFC-365mfc, HFC-43-10mee HFO-1234ye-E, HFO-1234ye-Z, HFO-1234yf, HFO-1234ze-E, HFO-1234ze-Z, HFO-1243zf, HFO-1336mzz-E, HFO-1336mzz-Z, HFO-1336yf, HFO-1336ze-E, HFO-1336ze-Z, HFO-1345mzz-E, HFO-1429mzy, HFO-1438ezy-E, HFO-1438ezy-Z, HFO-1438mzz-E, HFO-1438mzz-Z, HFO-153-10mzzy, HCFO-1224yd-E, HCFO-1224yd-Z, HCFO-1233xf, HCFO-1233zd-E, and HCFO-1233zd-Z.
36. The process of embodiment 35, wherein the blowing agent comprises:
    i) 1,2-dichloro-1,2-difluoroethylene; and
    ii) one or more compounds selected from cyclobutane, n-pentane, iso-pentane, HFC-245ca, HFC-245eb, HFC-245fa, HFC-365mfc, HFO-1234ze-E, HFO-1234ze-Z, HFO-1336mzz-E, HFO-1336mzz-Z, HFO-1336yf, HFO-1336ze-E, HFO-1438mzz-E, HFO-1438mzz-Z, HFO-153-10mzzy, HCFO-1224yd-E, HCFO-1224yd-Z, and HCFO-1233zd-E.
37. The process of embodiment 35, wherein the blowing agent comprises:
    i) 1,2-dichloro-1,2-difluoroethylene; and
    ii) one or more compounds selected from HFO-1336mzz-Z, HCFO-1233zd-E, HFC-245fa, n-pentane, iso-pentane, HFO-1336mzz-E, HFC-365mfc, HCFO-1224yd-E, HCFO-1224yd-Z, and HFO-1234ze-Z.
38. The process of embodiment 35, wherein the blowing agent comprises:
    i) 1,2-dichloro-1,2-difluoroethylene; and
    ii) one or more compounds selected from cyclobutane, HFC-245ca, HFC-245eb, HFO-1336yf, HFO-1336ze-E, HFO-1438mzz-E, HFO-1438mzz-Z, and HFO-153-10mzzy.
39. The process of any one of embodiments 35 to 38, wherein the foam is a thermoset foam.
40. The process of any one of embodiments 35 to 39, wherein the foam is a spray foam.
41. The process of any one of embodiments 35 to 40, wherein the foamable composition further comprises one or more additional components selected from at least one polyol, at least one catalyst, at least one surfactant, water, at least one flame retardant agent, and at least one nucleating agent.
42. The process of any one of embodiments 35 to 41, wherein the foamable composition comprises at least one polyol.
43. The process of embodiment 42, wherein the polyol is a polyester polyol.
44. The process of embodiment 42 or 43, wherein the polyol is a polyester polyol having a hydroxyl number of from about 200 mg KOH/g to about 300 mg KOH/g.
45. The process of embodiment 42 or 43, wherein the polyol is a polyester polyol having a hydroxyl number of from about 230 mg KOH/g to about 250 mg KOH/g.
46. The process of any one of embodiments 35 to 45, wherein the foamable composition comprises at least one catalyst.
47. The process of any one of embodiments 35 to 46, wherein the foamable composition comprises a metal catalyst and an amine catalyst.
48. The process of any one of embodiments 35 to 47, wherein the foamable composition comprises a surfactant.
49. The process of embodiment 48, wherein the surfactant is a silicone surfactant.
50. The process of any one of embodiments 35 to 49, wherein the foamable composition comprises water.
51. The process of any one of embodiments 35 to 50, wherein the foamable composition comprises a flame retardant agent.
52. The process of any one of embodiments 35 to 51, wherein the foamable composition comprises a nucleating agent.

53. The process of any one of embodiments 35 to 51, wherein the process is performed in the absence of a nucleating agent.
54. The process of any one of embodiments 35 to 53, wherein the foam is a polyurethane foam or a polyisocyanurate foam.
55. The process of any one of embodiments 35 to 54, wherein the foam is a closed cell foam.
56. In some embodiments, the present application provides a foam prepared according to the process of any one of embodiments 1 to 21 and 35 to 55.
57. In some embodiments, the present application provides a closed cell polystyrene foam prepared according to the process of any one of embodiments 1 to 21.
58. In some embodiments, the present application provides a closed cell polyisocyanurate foam prepared according to the process of any one of embodiments 35 to 55.
59. In some embodiments, the present application provides a closed cell polyurethane foam prepared according to the process of embodiments 35 to 55.
60. In some embodiments, the present application provides a composition comprising:
   i) 1,2-dichloro-1,2-difluoroethylene; and
   ii) one or more compounds selected from 2-chloropropane, n-propane, cyclopropane, n-butane, cyclobutane, iso-butane, cyclopentane, neo-pentane, water, methanol, ethanol, n-propanol, iso-propanol, dimethyl ether, ethyl methyl ether, diethyl ether, dimethoxymethane, methyl acetate, ethyl acetate, methyl formate, ethyl formate, ethylene oxide, propylene oxide, fluorinated epoxides, HFC-227ca, HFC-236ea, HFC-245ca, HFC-245eb, HFC-245cb, HFC-245ea, HFC-365mfc, HFC-4310mee HFO-1234ye-E, HFO-1234ye-Z, HFO-1243zf, HFO-1336ze-Z, HFO-1345mzz-E, HFO-1429mzy, HFO-1438ezy-E, HFO-1438ezy-Z, HFO-1438mzz-Z, HFO-1530mzzy, HCFO-1224yd-E, HCFO-1233xf, and HCFO-1233zd-Z.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. A process for preparing a thermoset polymer foam, the process comprising reacting a foamable composition comprising a polyol, an isocyanate, and a blowing agent under conditions effective to form the thermoset polymer foam, wherein the blowing agent comprises:
   i) 21.3 wt % to 70.8 wt % of 1,2-dichloro-1,2-difluoroethylene, and
   ii) 78.7 wt % to 29.2 wt % of one or more compounds selected from HFO-1336mzz-E and HFO-1336mzz-Z.

2. The process of claim 1, wherein the foam is a spray foam.

3. The process of claim 1, wherein the foamable composition further comprises one or more additional components selected from at least one catalyst, at least one surfactant, water, at least one flame retardant agent, and at least one nucleating agent.

4. The process of claim 3, wherein the polyol is a polyester polyol.

5. The process of claim 1, wherein the foamable composition comprises at least one catalyst.

6. The process of claim 1, wherein the foamable composition comprises a surfactant.

7. The process of claim 1, wherein the foamable composition comprises a flame retardant agent.

8. The process of claim 1, wherein the foamable composition comprises a nucleating agent.

9. The process of claim 1, wherein the foam is a polyurethane foam or a polyisocyanurate foam.

10. The process of claim 1, wherein the blowing agent comprises 1,2-dichloro-1,2-difluoroethylene and HFO-1336mzz-Z.

11. The process of claim 1, wherein the blowing agent comprises 1,2-dichloro-1,2-difluoroethylene and HFO-1336mzz-E.

* * * * *